(12) United States Patent
Sano

(10) Patent No.: US 9,297,997 B2
(45) Date of Patent: Mar. 29, 2016

(54) OPTICAL MODULE, ELECTRONIC APPARATUS, AND SPECTROSCOPIC CAMERA

(71) Applicant: Seiko Epson Corporation, Tokyo (JP)

(72) Inventor: Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 230 days.

(21) Appl. No.: 14/171,866

(22) Filed: Feb. 4, 2014

(65) Prior Publication Data

US 2014/0218586 A1    Aug. 7, 2014

(30) Foreign Application Priority Data

Feb. 5, 2013    (JP) ................................. 2013-020168

(51) Int. Cl.

| | |
|---|---|
| *G01N 21/25* | (2006.01) |
| *G02B 26/00* | (2006.01) |
| *G01J 3/26* | (2006.01) |
| *G02B 26/08* | (2006.01) |
| *G01J 3/51* | (2006.01) |
| *G02B 6/293* | (2006.01) |

(52) U.S. Cl.
CPC ................ *G02B 26/001* (2013.01); *G01J 3/26* (2013.01); *G01J 3/51* (2013.01); *G02B 26/0841* (2013.01); *G02B 6/29358* (2013.01)

(58) Field of Classification Search
CPC ... G01J 3/26; G02B 26/0841; G02B 26/0833; G02B 26/001
See application file for complete search history.

(56) References Cited

U.S. PATENT DOCUMENTS

| 5,751,469 A | 5/1998 | Arney et al. |
|---|---|---|
| 5,808,781 A | 9/1998 | Arney et al. |
| 7,368,846 B2 | 5/2008 | Mushika et al. |
| 7,635,939 B2 | 12/2009 | Mushika et al. |
| 8,081,314 B2 | 12/2011 | Kamihara |
| 2003/0034542 A1 | 2/2003 | Okumura |
| 2003/0123125 A1 | 7/2003 | Little |

(Continued)

FOREIGN PATENT DOCUMENTS

| EP | 2 367 035 A1 | 9/2011 |
|---|---|---|
| EP | 2369398 A1 | 9/2011 |

(Continued)

OTHER PUBLICATIONS

Extended European Search Report for Application No. EP 14 15 3779 dated May 6, 2014 (5 pages).

(Continued)

*Primary Examiner* — Michael A Lyons
*Assistant Examiner* — Maurice Smith
(74) *Attorney, Agent, or Firm* — Harness, Dickey & Pierce, P.L.C.

(57) ABSTRACT

An optical module includes a fixed reflection film, a movable reflection film, a first driver having a plurality of sub-drivers that can be driven independently of each other via voltage application in a plan view, a second driver that changes the dimension of a gap between the fixed reflection film and the movable reflection film, and a voltage controller that applies first drive voltages to the sub-drivers and applies a second drive voltage to the second driver, and the voltage controller applies a first drive voltage set for each of the sub-drivers in accordance with parallelism between the fixed reflection film and the movable reflection film at the time when the dimension of the gap is changed.

12 Claims, 12 Drawing Sheets

(56) References Cited

U.S. PATENT DOCUMENTS

| | | | |
|---|---|---|---|
| 2004/0100678 A1 | 5/2004 | Chang et al. | |
| 2007/0171531 A1 | 7/2007 | Nakamura | |
| 2009/0306479 A1* | 12/2009 | Kamihara | A61B 1/043 600/180 |
| 2010/0004511 A1 | 1/2010 | Kamihara | |
| 2010/0022840 A1* | 1/2010 | Yasuda | A61B 1/04 600/160 |
| 2010/0103522 A1 | 4/2010 | Matsumoto | |
| 2010/0225255 A1 | 9/2010 | Franke | |
| 2011/0222157 A1 | 9/2011 | Sano | |
| 2011/0222158 A1 | 9/2011 | Sano | |
| 2011/0228397 A1 | 9/2011 | Matsushita | |
| 2012/0200926 A1 | 8/2012 | Matsushita | |
| 2012/0206813 A1 | 8/2012 | Bahat et al. | |
| 2013/0279005 A1 | 10/2013 | Sano | |
| 2013/0308134 A1 | 11/2013 | Hirokubo | |
| 2014/0218586 A1 | 8/2014 | Sano | |
| 2015/0212313 A1 | 7/2015 | Hirokubo | |

FOREIGN PATENT DOCUMENTS

| | | |
|---|---|---|
| EP | 2664947 A1 | 11/2013 |
| EP | 2687832 A1 | 1/2014 |
| JP | 01-094312 | 4/1989 |
| JP | 07-243963 | 9/1995 |
| JP | 09-236760 | 9/1997 |
| JP | 2002-277758 A | 9/2002 |
| JP | 2003-101138 | 4/2003 |
| JP | 2003-140064 A | 5/2003 |
| JP | 2003-215473 A | 7/2003 |
| JP | 2004-170899 A | 6/2004 |
| JP | 2007-086517 A | 4/2007 |
| JP | 2008-183350 A | 8/2008 |
| JP | 2011-106936 A | 6/2011 |
| JP | 2011-191492 A | 9/2011 |
| JP | 2011-191554 A | 9/2011 |
| JP | 2012-163664 | 8/2012 |
| JP | 2012-168362 | 9/2012 |
| JP | 2012-198268 | 10/2012 |
| JP | 2013-072930 A | 4/2013 |
| JP | 2013-088601 A | 5/2013 |
| JP | 2013-218194 A | 10/2013 |
| JP | 2013-222122 A | 10/2013 |
| JP | 2013-238755 A | 11/2013 |
| JP | 2014-059497 A | 4/2014 |
| WO | WO-02-086582 A1 | 10/2002 |
| WO | WO-2004-041710 | 5/2004 |

OTHER PUBLICATIONS

Extended Search Report for European Patent Application No. 15 15 2295 dated Jun. 18, 2015 (7 pages).

Extended European Search Report for Application No. EP 13 16 7619 dated Aug. 20, 2013 (11 pages).

* cited by examiner

OPTICAL MODULE, ELECTRONIC APPARATUS, AND SPECTROSCOPIC CAMERA

BACKGROUND

1. Technical Field

The present invention relates to an optical module, an electronic apparatus, and a spectroscopic camera.

2. Related Art

There is a known wavelength tunable interference filter in which a pair of reflection films facing each other are provided and the distance between the reflection films is changed to extract light of a predetermined wavelength from light under measurement (see JP-A-7-243963, for example).

The wavelength tunable interference filter (optical resonator) described in JP-A-7-243963 includes a first substrate and a second substrate facing each other, reflection films disposed on the respective substrates and facing each other with an inter-reflection-film gap therebetween, and electrodes disposed on the respective substrates and facing each other. Further, one of the substrates (e.g., the second substrate) or a movable substrate is provided with a diaphragm. In the thus configured wavelength tunable interference filter, when a voltage is applied between the electrodes, the diaphragm can deform the second substrate to adjust the inter-reflection-film gap.

In the wavelength tunable interference filter disclosed in JP-A-7-243963 described above, which has a diaphragm-based configuration, however, the parallelism between the reflection films deteriorates when the inter-reflection-film gap is controlled due to unevenness in the thickness of the diaphragm, undesirably resulting in degradation in resolution of the filter.

SUMMARY

An advantage of some aspects of the invention is to provide an optical module, an electronic apparatus, and a spectroscopic camera having high resolution.

An optical module according to an aspect of the invention includes a first reflection film that reflects part of incident light and transmits part thereof, a second reflection film that faces the first reflection film via a gap, reflects part of incident light, and transmits part thereof, a first driver provided in a region outside an optical interference area formed by the first reflection film and the second reflection film in a plan view viewed in a thickness direction of the first reflection film and the second reflection film, the first driver having a plurality of sub-drivers that can be driven independently of each other via voltage application, a second driver that changes the dimension of the gap between the first reflection film and the second reflection film, and a voltage controller that applies first drive voltages to the sub-drivers and applies a second drive voltage to the second driver, and the voltage controller applies a first drive voltage set for each of the sub-drivers in accordance with parallelism between the first reflection film and the second reflection film at the time when the dimension of the gap is changed.

In the aspect of the invention, the voltage controller applies a first drive voltage set for each of the sub-drivers. The first drive voltages are set in accordance with the parallelism between the first reflection film and the second reflection film at the time when the dimension of the gap is changed. The application of the thus set voltages allows the sub-drivers to produce different magnitudes of force in such a way that the parallelism between the first reflection film and the second reflection film is maintained. As a result, deterioration in the parallelism between the reflection films resulting, for example, from unevenness in the thickness of each substrate in a wavelength tunable interference filter can be eliminated. The inter-reflection-film gap can therefore be changed with the reflection films maintained parallel to each other with precision, whereby high-wavelength-resolution light, that is, light of a wavelength having a small half-width value can be extracted. Further, since the inter-reflection-film gap can be controlled with the reflection films maintained parallel to each other with precision, the precision in wavelength increases in two-dimensional spectrometry.

In the optical module according to the aspect of the invention, it is preferable that the optical module further includes a gap detector that detects the dimension of the gap, and the voltage controller preferably applies the first drive voltages to the first driver to change the dimension of the gap by a predetermined amount and then applies a feedback voltage according to the size of gap detected with the gap detector to the second driver.

In this configuration, after the first driver is used to change the dimension of the gap by a predetermined amount, a feedback voltage to be applied to the second driver is set based on a detected dimension of the gap and then applied to the second driver.

That is, in the configuration described above, a target dimension of the gap is first set, the first driver changes the dimension of the gap to a value close to the target dimension of the gap, and the second driver is used to make fine adjustment of the remaining dimension of the gap based on the dimension of the gap detected by the gap detection section.

In the configuration described above, since the second drive voltage applied to the second driver is set based on the dimension of the gap that is always close to the target dimension of the gap, the second driver only needs to produce a force within a small range of magnitude, whereby the second driver can produce a force at low sensitivity to the second drive voltage applied thereto. Fine adjustment of the dimension of the gap can therefore be made with precision at the time of the feedback control. Further, since the fine adjustment of the dimension of the gap can be made with precision over a wide range of the gap with the gain of the second driver fixed, no component that allows the second driver to change the gain thereof is required, whereby the configuration can be simplified.

Moreover, when the dimension of the gap is changed by using only the second driver, the parallelism between the first reflection film and the second reflection film may deteriorate in relation to the changed amount of dimension of the gap. In the configuration described above, however, since the first driver is used to change the dimension of the gap to a value close to a target dimension of the gap, the first reflection film and the second reflection film are maintained parallel to each other with precision after the dimension of the gap is changed to the target dimension of the gap, whereby high wavelength resolution is achieved irrespective of a target dimension of the gap.

In the optical module according to the aspect of the invention, it is preferable that the gap detector detects the dimension of the gap by detecting capacitance between the first reflection film and the second reflection film.

In this configuration, the gap detector operates based on detection of the capacitance between the first reflection film and the second reflection film. In this configuration, in which the first reflection film and the second reflection film, which form the optical interference area, also serve as the gap detector, it is not necessary to separately provide electrodes for the gap detector, whereby the configuration can be simplified, resulting in a compact, thin wavelength tunable interference filter.

In the optical module according to the aspect of the invention, it is preferable that the first driver has three or more sub-drivers, and the voltage controller applies the first drive voltage having either of two types of voltage waveforms to each of the sub-drivers.

In this configuration, the sub-drivers are controlled by application of the first drive voltages having two types of voltage waveforms to the sub-drivers. In this configuration, for example, when the number of sub-drivers is three, a large first drive voltage can be applied to two of the sub-drivers and a small first drive voltage can be applied to the remaining sub-driver to change the inclination of the reflection film on a movable portion. The electrode to which the small first drive voltage is applied may be selected by checking the actual inclination direction of the reflection film on the movable portion in an inspection before shipment, and the first drive voltages may be set in accordance with the amount of inclination. As described above, since the sub-drivers are controlled by the first drive voltages having two types of voltage waveforms, the configuration of a control system (such as drive circuit) used in the voltage controller can be simplified.

In the optical module according to the aspect of the invention, it is preferable that one of the first drive voltages having two types of voltage waveforms has a reference voltage waveform.

In this configuration, one of the first drive voltages having two types of voltage waveforms has a reference potential waveform (GND potential), that is, a non-drive waveform. In this configuration, the sub-drivers are controlled by first drive voltages having one type of voltage waveform in an actual sense, which means that one control system (such as drive circuit) is used in the voltage controller, whereby the configuration can be further simplified. Further, no mechanical or electrical interference occurs unlike a case where a plurality of control systems (such as drive circuits) are provided.

In the optical module according to the aspect of the invention, it is preferable that the first driver has three or more sub-drivers, that the voltage controller applies the first drive voltage having either of three types of voltage waveforms to each of the sub-drivers, and that one of the first drive voltages having three types of voltage waveforms has a reference voltage waveform.

In this configuration, one of the first drive voltages having three types of voltage waveforms has the reference potential waveform, that is, the non-drive waveform. In this configuration, the sub-drivers are controlled by first drive voltages having two types of voltage waveforms in an actual sense, which means that two control systems (such as drive circuits) are used in the voltage controller, whereby deterioration in the parallelism between the reflection films can be eliminated with greater precision. For example, when the number of sub-drivers is five, the following voltage application can, for example, be employed: The non-drive voltage is applied to one of the sub-drivers; a small first drive voltage is applied to another sub-driver; and a large first drive voltage is applied to the remaining three sub-drivers. As a result, light of a desired wavelength can be extracted through a wavelength tunable interference filter with high precision. Further, since the sub-drivers are controlled by using the first drive voltages having two types of voltage waveforms, the number of control systems (such as drive circuits) used in the voltage controller can be reduced.

In the optical module according to the aspect of the invention, it is preferable that each of the first driver and the second driver is an electrostatic actuator.

In this configuration, each of the first driver and the second driver is formed of an electrostatic actuator. In this configuration, only electrodes facing each other need to be provided, whereby the configuration can be simplified, resulting in a compact, thin optical module. Further, the inter-reflection-film gap can be readily changed only by changing the voltage applied between the electrodes, whereby the inter-reflection-film gap can be also readily controlled.

In the optical module according to the aspect of the invention, it is preferable that the first driver controls parallelism between the first reflection film and the second reflection film, and the second driver preferably changes the dimension of the gap.

In this configuration, the first driver controls parallelism between the reflection films, and the second driver changes the dimension of the gap. In this configuration, high-wavelength-resolution light, that is, light of a wavelength having a small half-width value can be extracted. Further, since the inter-reflection-film gap can be controlled with the reflection films maintained parallel to each other with precision, the precision in wavelength increases in two-dimensional spectrometry.

In the optical module according to the aspect of the invention, it is preferable that the first driver is disposed in a region outside the second driver in the plan view.

In this configuration, providing the first driver in a region outside the second driver allows an adjustment range over which the parallelism between the reflection films is changed can be wider than in a configuration in which the first driver is disposed in a region inside the second driver, whereby deterioration in the parallelism between the reflection films can be precisely eliminated.

In the optical module according to the aspect of the invention, it is preferable that the plurality of sub-drivers of the first driver are disposed in an arcuate form along the circumference of an imaginary circle around the center of the first reflection film and the center of the second reflection film at equal angular intervals along the circumference of the imaginary circle in the plan view.

In this configuration, the arrangement of the plurality of sub-drivers disposed at equal angular intervals allows electrostatic attractive forces to act in a satisfactorily balanced manner with respect to the centers. As a result, even when the parallelism deteriorates in any position in the optical interference area, the deterioration in the parallelism can be eliminated by applying appropriate first drive voltages in accordance with the position where the parallelism has deteriorated.

An electronic apparatus according to another aspect of the invention includes an optical module and a control unit that controls the optical module, the optical module including a first reflection film that reflects part of incident light and transmits part thereof, a second reflection film that faces the first reflection film via a gap, reflects part of incident light, and transmits part thereof, a first driver provided in a region outside an optical interference area formed by the first reflection film and the second reflection film in a plan view viewed in a thickness direction of the first reflection film and the second reflection film, the first driver having a plurality of sub-drivers that can be driven independently of each other via voltage application, a second driver that changes the dimension of the gap between the first reflection film and the second reflection film, and a voltage controller that applies first drive voltages to the sub-drivers and applies a second drive voltage to the second driver, and the voltage controller applies a first drive voltage set for each of the sub-drivers in accordance with parallelism between the first reflection film and the second reflection film at the time when the second driver changes dimension of the gap.

In the aspect of the invention, deterioration in the parallelism between the reflection films resulting, for example, from unevenness in the thickness of each substrate in a wavelength tunable interference filter can be eliminated, as in the aspect of the invention described above. The inter-reflection-film gap can therefore be changed with the reflection films maintained parallel to each other with precision, whereby high-wavelength-resolution light, that is, light of a wavelength having a small half-width value can be extracted. Further, since the inter-reflection-film gap can be controlled with the reflection films maintained parallel to each other with precision, the precision in wavelength increases in two-dimensional spectrometry.

A spectroscopic camera according to another aspect of the invention includes an optical module and a control unit that controls the optical module, the optical module including a first reflection film that reflects part of incident light and transmits part thereof, a second reflection film that faces the first reflection film via a gap, reflects part of incident light, and transmits part thereof, a first driver provided in a region outside an optical interference area formed by the first reflection film and the second reflection film in a plan view viewed in a thickness direction of the first reflection film and the second reflection film, the first driver having a plurality of sub-drivers that can be driven independently of each other via voltage application, a second driver that changes the dimension of the gap between the first reflection film and the second reflection film, a voltage controller that applies first drive voltages to the sub-drivers and applies a second drive voltage to the second driver, and an imaging section that receives light of a wavelength selected based on interference of light that enters a space between the first reflection film and the second reflection film to capture a spectroscopic image, and the voltage controller applies a first drive voltage set for each of the sub-drivers in accordance with parallelism between the first reflection film and the second reflection film at the time when the second driver changes dimension of the gap.

In the aspect of the invention, deterioration in the parallelism between the reflection films resulting, for example, from unevenness in the thickness of each substrate in a wavelength tunable interference filter can be eliminated, as in the aspects of the invention described above. Therefore, the inter-reflection-film gap can be changed with the reflection films maintained parallel to each other with precision, and variation in wavelength of the light passing through the reflection films can be suppressed, whereby the precision in wavelength increases in two-dimensional spectrometry and a precise spectroscopic image can therefore be captured. Further, since the inter-reflection-film gap can be controlled with the reflection films maintained parallel to each other with precision, high-wavelength-resolution light, that is, light of a wavelength having a small half-width value can be extracted.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

A first embodiment according to the invention will be described below with reference to the drawings.
Configuration of Spectroscopic Camera 1

Figure 1:
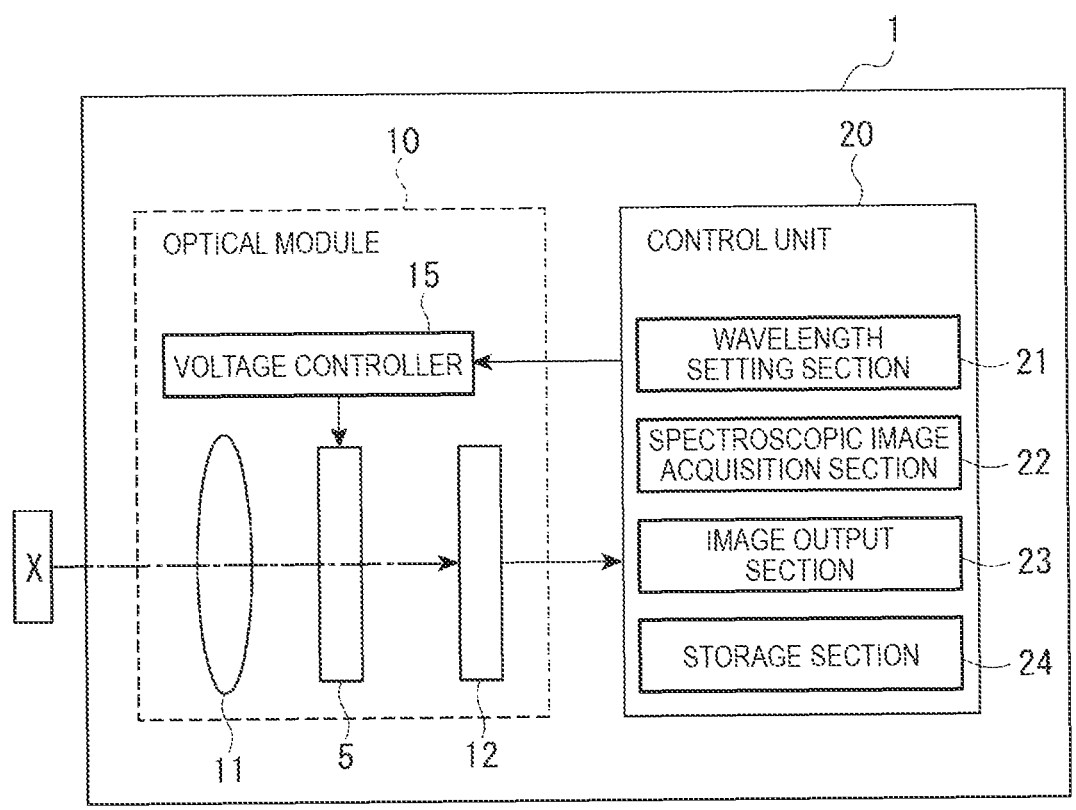
FIG. 1 is a block diagram showing a schematic configuration of a spectroscopic camera of a first embodiment according to the invention.

FIG. 1 is a block diagram showing a schematic configuration of a spectroscopic camera of the first embodiment according to the invention.

A spectroscopic camera 1 is an electronic apparatus according to an embodiment of the invention and an apparatus that captures a spectroscopic image of an object X under measurement.

The spectroscopic camera 1 includes an optical module 10 and a control unit 20, which controls the optical module 10, as shown in FIG. 1. The spectroscopic camera 1 further includes, although not shown, an operation section that is operated by a user to output an operation signal to the control unit 20. The spectroscopic camera 1 may still further include a light source that irradiates the object X under measurement with light, a display section that displays a captured spectroscopic image, an interface through which the spectroscopic image is transmitted to another apparatus, and other components.

The optical module 10 includes a lens group 11, which guides image light representing the object X under measurement and focuses the image light on an imaging section 12, a wavelength tunable interference filter 5, the imaging section 12, and a voltage controller 15.

The imaging section 12 receives light having passed through the wavelength tunable interference filter 5 (image light) and outputs a captured image (spectroscopic image) to the control unit 20.

Configuration of Wavelength Tunable Interference Filter

The wavelength tunable interference filter 5 in the optical module 10 will be described below.

Figure 2:
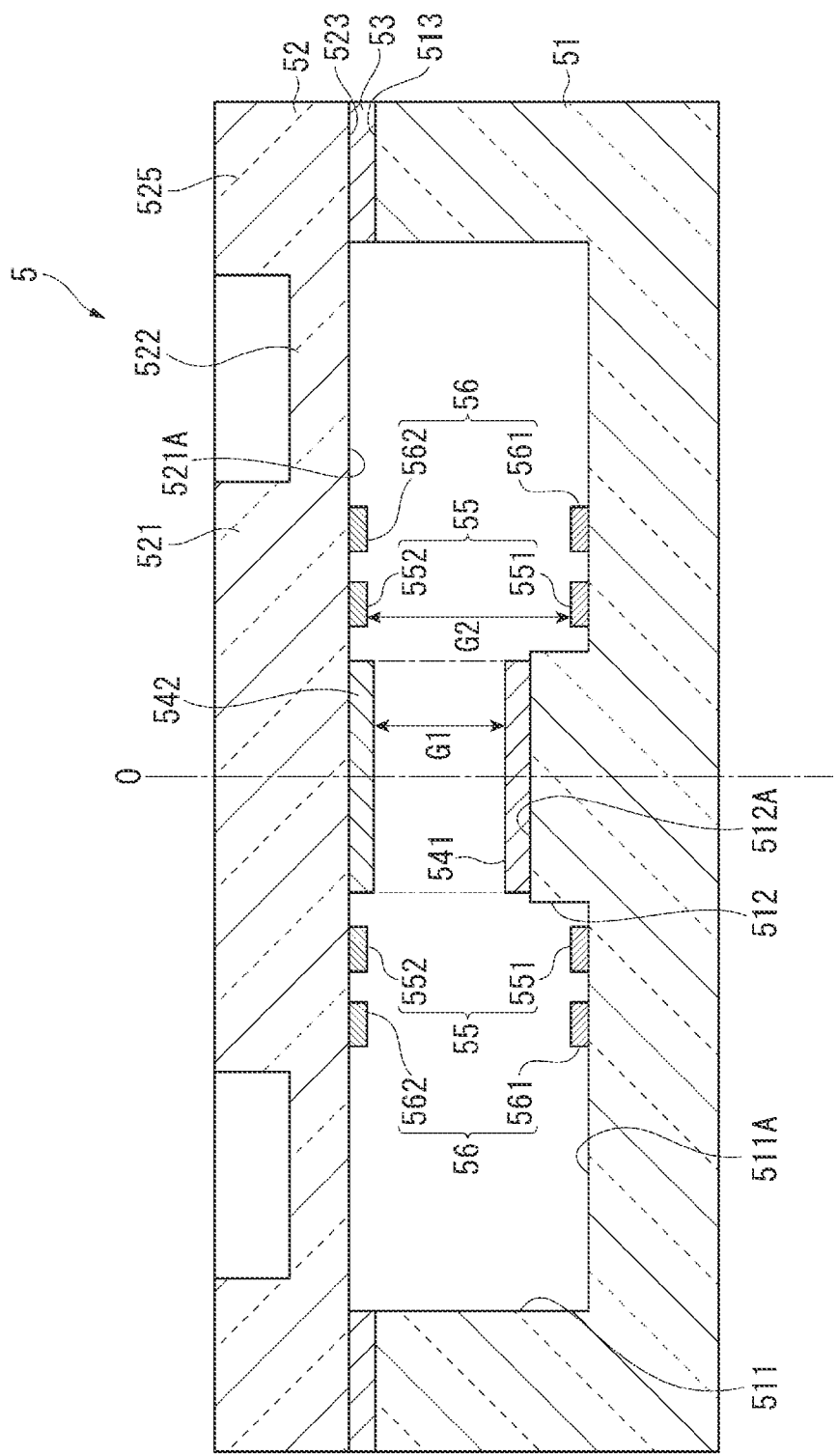
FIG. 2 is a cross-sectional view of a wavelength tunable interference filter of the first embodiment.

FIG. 2 is a cross-sectional view of the wavelength tunable interference filter according to the first embodiment.

The wavelength tunable interference filter 5 is, for example, a rectangular-plate-shaped optical member and includes a fixed substrate 51, which forms a first substrate, and a movable substrate 52, which forms a second substrate, as shown in FIG. 2. Each of the fixed substrate 51 and the movable substrate 52 is made, for example, of soda glass, crystalline glass, quartz glass, lead glass, potassium glass, borosilicate glass, no-alkali glass, or any of a variety of other glass materials or quartz. A first bonding portion 513 of the fixed substrate 51 and a second bonding portion 523 of the movable substrate 52 are bonded to each other via a bonding film 53 formed, for example, of a plasma polymerization film primarily made, for example, of siloxane so that the fixed substrate 51 and the movable substrate 52 are integrated with each other.

Figure 3:
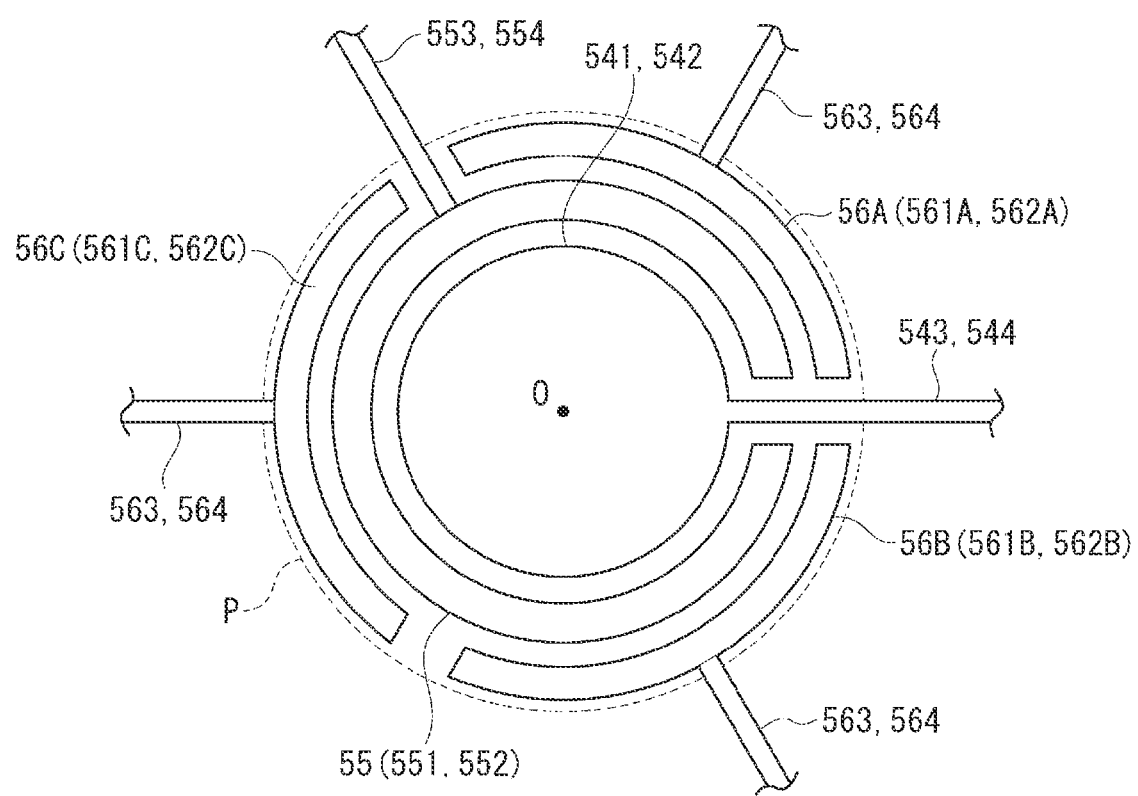
FIG. 3 shows an electrode configuration in the wavelength tunable interference filter of the present embodiment.

FIG. 3 shows an electrode configuration in the wavelength tunable interference filter 5 of the present embodiment.

The fixed substrate 51 is provided with a fixed reflection film 541, which forms a first reflection film according to an embodiment of the invention, and the movable substrate 52 is provided with a movable reflection film 542, which forms a second reflection film according to an embodiment of the invention. The fixed reflection film 541 and the movable reflection film 542 are disposed so that they face each other with an inter-reflection-film gap G1.

The fixed substrate 51 is further provided with a first electrode 551 and a second electrode 561, and the movable substrate 52 is provided with a third electrode 552 and a fourth electrode 562. The first electrode 551 and the third electrode 552 are disposed so that they face each other with an inter-electrode gap G2. The second electrode 561 and the fourth electrode 562 are disposed so that they face each other with the inter-electrode gap G2.

The fixed reflection film 541 and the movable reflection film 542 are conductive. The first electrode 551 and the third electrode 552 form a first electrostatic actuator 55, which forms a second driver according to an embodiment of the invention. Further, the second electrode 561 and the fourth electrode 562 form a second electrostatic actuator 56, which forms a first driver according to an embodiment of the invention.

In the following description, a plan view viewed in the substrate thickness direction of the fixed substrate 51 or the movable substrate 52, that is, a plan view in which the wavelength tunable interference filter 5 is viewed in the direction in which the fixed substrate 51, the bonding film 53, and the movable substrate 52 are stacked on each other is referred to as a filter plan view. Further, in the present embodiment, the center point of the fixed reflection film 541 and the center point of the movable reflection film 542 coincide with each other in the filter plan view. Each of the center points of the reflection films in the plane view is referred to as a filter center point O, and a straight line passing through the center points of the reflection films is referred to as a central axis.

Configuration of Fixed Substrate

The fixed substrate 51 is formed to be thicker than the movable substrate 52 and is not hence bent due to an electrostatic attractive force produced by the electrostatic actuators 55 and 56 or internal stress induced in film members formed on the fixed substrate 51 (fixed reflection film 541, for example).

The fixed substrate 51 has an electrode placement groove 511 and a reflection film placement portion 512, which are formed, for example, in an etching process, as shown in FIG. 2.

The electrode placement groove 511 is formed so that it has an annular shape around the filter center point O of the fixed substrate 51 in the filter plan view. The reflection film placement portion 512 is formed so that it protrudes from a central portion of the electrode placement groove 511 in the filter plan view toward the movable substrate 52. A groove bottom surface of the electrode placement groove 511 forms an electrode attachment surface 511A, on which the first electrode 551 of the first electrostatic actuator 55 and the second electrode 561 of the second electrostatic actuator 56 are disposed. Further, the front end surface of the thus protruding reflection film placement portion 512 forms a reflection film attachment surface 512A.

The fixed substrate 51 is further provided with an electrode drawing groove (not shown) that extends from the electrode placement groove 511 toward the outer circumferential edge of the fixed substrate 51.

The first electrode 551, which forms the first electrostatic actuator 55, is disposed on the electrode attachment surface 511A of the electrode placement groove 511. The first electrode 551 may be made of any electrode material that forms a conductive electrode. For example, the first electrode 551 may be formed of an ITO (indium tin oxide) electrode, a TiW/Au laminate electrode, or a Cr/Au laminate electrode.

The first electrode 551 is disposed on the electrode attachment surface 511A in a region facing a movable portion 521, which will be described later. The first electrode 551 is formed so that it has an arcuate shape (substantially C-like shape). An insulating film for ensuring insulation between the first electrode 551 and the third electrode 552 may be layered on the first electrode 551.

On the fixed substrate 51, a first drawn electrode 553 is connected to the outer circumferential edge of the first electrode 551, as shown in FIG. 3. The first drawn electrode 553 is disposed along the electrode drawing groove and extends onto a first terminal extraction portion (not shown) provided on an outer circumferential portion of the fixed substrate 51. The tip of the thus extending first drawn electrode 553 is connected to a second drive circuit 153 (see FIG. 4), which will be described later, in the voltage controller 15 via an FPC (flexible printed circuit), a lead wire, or any other component.

The second electrode 561, which forms the second electrostatic actuator 56, is also disposed on the electrode attachment surface 511A of the electrode placement groove 511. The second electrode 561 may be made of any electrode material that forms a conductive electrode. For example, the second electrode 561 may be formed, for example, of an ITO electrode, a TiW/Au laminate electrode, or a Cr/Au laminate electrode.

The second electrode 561 is formed in a region outside the first electrode 551 in the filter plan view, specifically, on the electrode attachment surface 511A in a region facing the movable portion 521, which will be described later. The second electrode 561 is formed of a plurality of arcuate second sub-electrodes 561A, 561B, and 561C, which are disposed in a region outside the first electrode 551 and along the circumference of an imaginary circle P around the filter center point O.

In the present embodiment, the second sub-electrodes 561A, 561B, and 561C are formed so that they have the same shape in the filter plan view. Further, the second sub-electrodes 561A, 561B, and 561C are disposed at equal angular intervals (120-degree intervals) along the circumference of the imaginary circle P. An insulating film for ensuring insulation between the second electrode 561 and the fourth electrode 562 may be layered on the second electrode 561.

A second drawn electrode 563 is provided on the fixed substrate 51 and extends from one end of each of the second sub-electrodes 561A, 561B, and 561C toward the first terminal extraction portion, as shown in FIG. 3. The second drawn electrodes 563 are formed of second drawn sub-electrodes 563A, 563B, and 563C corresponding to the second sub-electrodes 561A, 561B, and 561C. The second drawn sub-electrodes 563A, 563B, and 563C are disposed along the electrode drawing groove (not shown), extend onto the first terminal extraction portion, and are connected to a first drive circuit 151, which will be described later, in the voltage controller 15 via an FPC (flexible printed circuit), lead wires, or any other component.

The reflection film placement portion 512 is coaxial with the electrode placement groove 511, has a substantially cylindrical shape having a diameter smaller than that of the electrode placement groove 511, and has the reflection film attachment surface 512A facing the movable substrate 52, as described above.

The fixed reflection film 541 is disposed on the reflection film placement portion 512, as shown in FIGS. 2 and 3. The fixed reflection film 541 can be formed, for example, of a metal film made, for example, of Ag or a conductive alloy film made, for example, of an Ag alloy. In particular, an Ag alloy film having a highly reflective characteristic over a wide wavelength band from the visible light range to the near infrared range is more preferably used.

The fixed reflection film 541 may instead be formed of a dielectric multilayer film, for example, having a high refractive layer made of $TiO_2$ and a low refractive layer made of $SiO_2$.

When a dielectric multilayer film is used as the fixed reflection film 541, a conductive film is layered as the lowermost layer of the dielectric multilayer film. Alternatively, a conductive film may be layered as the uppermost layer (front layer) of the dielectric multilayer film. In either of the configurations described above, even when the dielectric multilayer film is not conductive, the conductive film makes the fixed reflection film 541 conductive.

In a configuration in which the dielectric multilayer film described above is used, the conductive film is preferably made of a conductive material that satisfactorily adheres to a first layer of the dielectric multilayer film (layer closest to fixed substrate 51) and the fixed substrate 51. On the other hand, in a configuration in which a conductive film is layered as the uppermost layer (front layer) of the dielectric multilayer film, the conductive film is preferably made of a conductive material that satisfactorily adheres to the uppermost layer of the dielectric multilayer film (layer closest to movable substrate 52). In this case, the conductive film can, for example, be an ITO film.

The conductive film may instead be a reflection film having a highly reflective characteristic over a wavelength range under measurement, for example, a reflection film made of an Ag alloy. In this case, not only can the conductive film widen the wavelength range to be measured by the wavelength tunable interference filter 5, whereby light of a desired target wavelength can be extracted over a wide wavelength band, but also the dielectric multilayer film allows extraction of the light of the target wavelength at high resolution. In this case, a transparent adhesive layer may further be interposed between the conductive film and the reflection film placement portion 512 and between the conductive film and the dielectric multilayer film in order to improve adherence.

The fixed substrate 51 is further provided with a fixed drawn electrode 543, which is connected to the outer circumferential edge of the fixed reflection film 541, passes through the C-shaped opening of the first electrode 551, and extends toward the first terminal extraction portion, as shown in FIG. 3. The fixed drawn electrode 543 may be formed simultaneously with the fixed reflection film 541 in a film formation process thereof. It is further preferable that the fixed drawn electrode 543 is made of the same material as that of the first electrode 551, the second electrode 561, and other electrodes and the fixed reflection film 541 is connected to the thus formed fixed drawn electrode 543, because wiring film thickness and electric resistance can be designed independently of the thickness of the reflection film.

When the fixed reflection film 541 is formed of a laminate of a dielectric multilayer film and a conductive film, the fixed drawn electrode 543 is formed simultaneously with the conductive film and connected thereto.

The tip of the thus extending fixed drawn electrode 543 is disposed on the first terminal extraction portion and connected to the voltage controller 15, for example, via an FPC or a lead wire. The fixed drawn electrode 543 is connected to a gap detection device 152 in the voltage controller 15, as will be described later in detail.

An antireflection film may be formed on a light incident surface of the fixed substrate 51 (surface on which fixed reflection film 541 is not provided) in a position corresponding to the fixed reflection film 541. The antireflection film can be formed by alternately stacking a low refractive index film and a high refractive index film, and the antireflection film decreases visible light reflectance of the surface of the fixed substrate 51 whereas increases visible light transmittance thereof.

Part of the surface of the fixed substrate 51 that faces the movable substrate 52, specifically, the surface where the electrode placement groove 511, the reflection film placement portion 512, or the electrode drawing groove (not shown) is not formed forms the first bonding portion 513. The first bonding portion 513 is bonded to the second bonding portion 523 of the movable substrate 52 via the bonding film 53.

Configuration of Movable Substrate

The movable substrate 52 has a circular movable portion 521, which is formed around the filter center point O, a holding portion 522, which is coaxial with the movable portion 521 and holds the movable portion 521, and a substrate outer circumferential portion 525, which is provided in a region outside the holding portion 522, in the filter plan view.

The movable portion 521 is formed to be thicker than the holding portion 522. In the present embodiment, for example, the movable portion 521 is formed to be as thick as the movable substrate 52. The movable portion 521 is formed so that it has a diameter greater than at least the diameter of the outer circumferential edge of the reflection film attachment surface 512A in the filter plan view. An antireflection film may be formed on the surface of the movable portion 521 that faces away from the fixed substrate 51.

The third electrode 552 is disposed in a region outside the movable reflection film 542 in the filter plan view and faces the first electrode 551 via the inter-electrode gap G2. The third electrode 552 may be made of any electrode material that forms a conductive electrode. For example, the third electrode 552 may be formed, for example, of an ITO electrode, a TiW/Au laminate electrode, or a Cr/Au laminate electrode.

The third electrode 552 has an arcuate (substantially C-like) shape, as shown in FIG. 3. In FIG. 3, the third electrode 552 is disposed so that the C-shaped opening thereof coincides with the C-shaped opening of the first electrode 551 in the filter plan view by way of example. The C-shaped openings of the first electrode 551 and the third electrode 552 may instead be located so that they are symmetrical with respect to the filter center point O. In this case, an electrostatic attractive force F2 produced by the first electrostatic actuator 55 can be more uniformly balanced. Further, an insulating film may be layered on the third electrode 552, as in the case of the first electrode 551.

The first electrostatic actuator 55 forms an arcuate region where the third electrode 552 coincides with the first electrode 551 in the filter plan view. The first electrostatic actuator 55 is shaped and disposed so that it is substantially symmetrical with respect to the filter center point O in the filter plan view. The electrostatic attractive force F2 produced when a voltage is applied to the first electrostatic actuator 55 therefore acts on positions symmetrical with respect to the filter center point O, whereby the movable portion 521 can be displaced toward the fixed substrate 51 in a satisfactorily balanced manner. The first electrostatic actuator 55 forms the second driver.

The movable substrate 52 is provided with a third drawn electrode 554, which extends from the outer circumferential edge of the third electrode 552 toward a second terminal extraction portion (not shown) provided on an outer circumferential portion of the movable substrate 52. The tip of the thus extending third drawn electrode 554 is connected to the second drive circuit 153, which will be described later, in the voltage controller 15, for example, via an FPC or a lead wire. FIG. 3 shows that the third drawn electrode 554 coincides with the first drawn electrode 553 when viewed from above, but they are disposed so that they do not coincide with each other when viewed from above in an actual arrangement.

The fourth electrode 562 is formed in a region outside the third electrode 552 in the filter plan view and faces the second electrode 561 via the inter-electrode gap G2. The fourth electrode 562 may be made of any electrode material that forms a conductive electrode. For example, the fourth electrode 562 may be formed, for example, of an ITO electrode, a TiW/Au laminate electrode, or a Cr/Au laminate electrode.

The fourth electrode 562 is formed of a plurality of arcuate fourth sub-electrodes 562A, 562B, and 562C, which are disposed in a region outside the third electrode 552 and along the circumference of the imaginary circle P around the filter center point O. The second sub-electrode 561A and the fourth sub-electrode 562A form a second electrostatic sub-actuator 56A. The second sub-electrode 561B and the fourth sub-electrode 562B form a second electrostatic sub-actuator 56B. The second sub-electrode 561C and the fourth sub-electrode 562C form a second electrostatic sub-actuator 56C. Each of the second electrostatic sub-actuators is a sub-driver.

In the present embodiment, the fourth sub-electrodes 562A, 562B, and 562C are formed so that they have the same shape in the filter plan view. Further, the fourth sub-electrodes 562A, 562B, and 562C are disposed at equal angular intervals (120-degree intervals) along the circumference of the imaginary circle P. An insulating film for ensuring insulation between the second electrode 561 and the fourth electrode 562 may be layered on the fourth electrode 562.

The second electrostatic actuator 56 forms an arcuate region where the fourth electrode 562 coincides with the second electrode 561 in the filter plan view. The second electrostatic actuator 56 forms the first driver.

The movable substrate 52 is provided with a fourth drawn electrode 564, which extends from the outer circumferential edge of each of the fourth sub-electrodes 562A, 562B, and 562C toward the second terminal extraction portion. The fourth drawn electrodes 564 are formed of fourth drawn sub-electrodes 564A, 564B, and 564C corresponding to the fourth sub-electrodes 562A, 562B, and 562C. The fourth drawn electrodes 564 are disposed along an electrode drawing groove (not shown) and extend onto the second terminal extraction portion. The tip of each of the thus extending fourth drawn electrodes 564 is connected to the first drive circuit 151, which will be described later, in the voltage controller 15, for example, via an FPC (flexible printed circuit) or a lead wire. FIG. 3 shows that the fourth drawn electrodes 564 coincide with the second drawn electrodes 563 when viewed from above, but they are disposed so that they do not coincide with each other when viewed from above in an actual arrangement.

The movable reflection film 542 is disposed in a central portion of a movable surface 521A of the movable portion 521 so that the movable reflection film 542 faces the fixed reflection film 541 via the inter-reflection-film gap G1. The movable reflection film 542 has the same configuration as that of the fixed reflection film 541 described above. In the present embodiment, since the first electrode 551 and the second electrode 561 are disposed on the electrode attachment surface 511A, and the fixed reflection film 541 is disposed on the reflection film attachment surface 512A located in a position shifted from the electrode attachment surface 511A toward the movable substrate 52, the inter-reflection-film gap G1 is smaller than the inter-electrode gap G2.

The movable substrate 52 is further provided with a movable drawn electrode 544, which is connected to the outer circumferential edge of the movable reflection film 542, passes through the C-shaped opening of the third electrode 552, and extends toward the second terminal extraction portion. The movable drawn electrode 544 is formed simultaneously with the movable reflection film 542 in a film formation process thereof.

When the movable reflection film 542 is formed of a laminate of a dielectric multilayer film and a conductive film, the movable drawn electrode 544 is formed simultaneously with the conductive film and connected thereto.

The tip of the thus extending movable drawn electrode 544 is disposed on the second terminal extraction portion and connected to the voltage controller 15, for example, via an FPC or a lead wire. The movable drawn electrode 544 is connected to the gap detection device 152 in the voltage controller 15, as will be described later in detail. FIG. 3 shows that the movable drawn electrode 544 coincides with the fixed drawn electrode 543 when viewed from above, but they are disposed so that they do not coincide with each other when viewed from above in an actual arrangement.

In the present embodiment, the size of the inter-electrode gap G2 is greater than the size of the inter-reflection-film gap G1 as shown in FIG. 2 by way of example, but the sizes of the gaps are not necessarily set this way. For example, when the light under measurement is infrared light or far infrared light, the size of the inter-reflection-film gap G1 may be greater than the size of the inter-electrode gap G2 depending on the wavelength range of the light under measurement.

The holding portion 522 is a diaphragm that surrounds the movable portion 521 and is formed to be thinner than the movable portion 521. The thus configured holding portion 522 is more readily bent than the movable portion 521 and can hence displace the movable portion 521 toward the fixed substrate 51 under a small amount of electrostatic attractive force. Since the movable portion 521 is thicker and hence more rigid than the holding portion 522, the movable portion 521 is not deformed even when the holding portion 522 is attracted toward the fixed substrate 51 by an electrostatic force. The movable reflection film 542 provided on the movable portion 521 will therefore not be bent, whereby the fixed reflection film 541 and the movable reflection film 542 can be maintained parallel to each other.

In the present embodiment, the diaphragm-shaped holding portion 522 is presented by way of example, but the holding portion 522 is not necessarily formed of a diaphragm. For example, beam-shaped holding portions disposed at equal angular intervals may be provided around the filter center point O.

The substrate outer circumferential portion 525 is disposed in a region outside the holding portion 522 in the filter plan view, as described above. The second bonding portion 523, which faces the first bonding portion 513, is provided on the surface of the substrate outer circumferential portion 525 that faces the fixed substrate 51, and the second bonding portion 523 is bonded to the first bonding portion 513 via the bonding film 53.

Configuration of Voltage Controller

Figure 4:
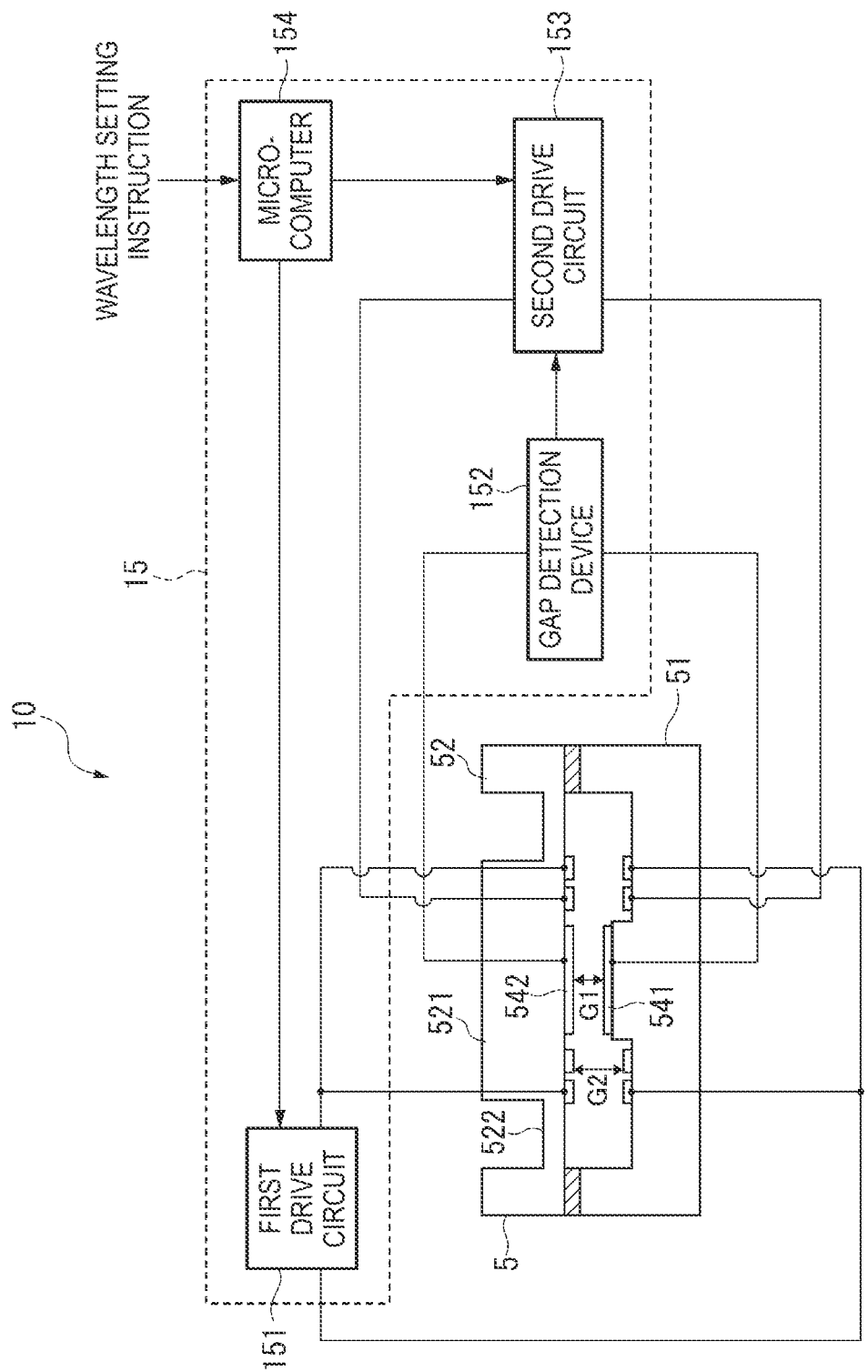
FIG. 4 is a block diagram showing a schematic configuration of a voltage controller in an optical module.

FIG. 4 is a block diagram showing a schematic configuration of the voltage controller 15 in the optical module 10. The voltage controller 15 includes the first drive circuit 151 (first drive voltage application section), the gap detection device 152 (gap detector), the second drive circuit 153 (second drive voltage application section), and a microcomputer (microcontroller) 154, as shown in FIG. 4.

The first drive circuit 151 is connected to the second drawn electrodes 563 and the fourth drawn electrodes 564 in the wavelength tunable interference filter 5 and applies first drive voltages to the second electrostatic actuator 56. Specifically, the first drive circuit 151 is formed of a D/A converter having a predetermined number of bits and applies voltages to the second electrostatic actuator 56 based on a bias signal inputted from the microcomputer 154. The first drive circuit 151 is connected to the second drawn electrodes 563 and the fourth drawn electrodes 564 in a wire bonding process.

The gap detection device 152 is connected to the fixed drawn electrode 543 and the movable drawn electrode 544 in the wavelength tunable interference filter 5 and acquires a detection signal according to the size of inter-reflection-film gap G1. The gap detection device 152 then outputs the acquired detection signal to the second drive circuit 153. The gap detection device 152 is connected to the fixed drawn electrode 543 and the movable drawn electrode 544 in a wiring bonding process.

The second drive circuit 153 is connected to the first drawn electrode 553 and the third drawn electrode 554 in the wavelength tunable interference filter 5 and applies a second drive voltage (feedback voltage) to the first electrostatic actuator 55. In this process, the second drive circuit 153 applies the second drive voltage (feedback voltage) to the first electrostatic actuator 55 in such a way that the detection signal inputted from the gap detection device 152 has a value equal to a target value (target detection signal) inputted from the microcomputer 154. The second drive circuit 153 is connected to the first drawn electrode 553 and the third drawn electrode 554 in a wire bonding process.

The second drive circuit 153 in the present embodiment is formed of an analog control device having a fixed gain and has a voltage variable range set at a predetermined width. An analog control device of this type can be incorporated based on a system configuration simpler than, for example, a system configuration based on which an analog control device having a variable gain is incorporated and can hence achieve cost reduction. The analog control device can, for example, be a PI control device or a PID control device. Other types of control device may also be used.

The microcomputer 154 is connected to the control unit 20, the first drive circuit 151, the gap detection device 152, and the second drive circuit 153. The microcomputer 154 includes a storage section (not shown) formed, for example, of a memory. The storage section stores, for example, gap correlation data that are detection signals (voltage signals) detected with the gap detection device 152 that correspond to various sizes of the inter-reflection-film gap G1 and V-λ data that are first drive voltages applied to the second electrostatic sub-actuators 56A, 56B, and 56C of the second electrostatic actuator 56 in response to a wavelength instruction inputted from the control unit 20. The V-λ, data will be described later in detail.

The microcomputer 154 controls the first drive circuit 151, the gap detection device 152, and the second drive circuit 153 based on a control signal inputted from the control unit 20 to cause the wavelength tunable interference filter 5 to transmit light of a target wavelength.

How the voltage controller 15 controls the second drive voltage applied to the wavelength tunable interference filter 5 will be described later in detail.

Configuration of Control Unit

Referring back to FIG. 1, the control unit 20 of the spectroscopic camera 1 will be described.

The control unit 20, which corresponds to a processor according to an embodiment of the invention, is, for example, a combination of a CPU, a memory, and other components and controls the overall action of the spectroscopic camera 1. The control unit 20 includes a wavelength setting section 21, a spectroscopic image acquisition section 22, an image output section 23, and a storage section 24, as shown in FIG. 1.

The wavelength setting section 21 sets a target wavelength of light to be extracted through the wavelength tunable interference filter 5 and outputs a wavelength instruction (control signal) to the voltage controller 15 to cause the wavelength tunable interference filter 5 to extract light of the set target wavelength.

The spectroscopic image acquisition section 22 acquires a captured image captured by the imaging section 12 and stores the captured image in the storage section 24.

The image output section 23 displays the captured spectroscopic image, for example, on a display section (not shown) and transmits the spectroscopic image to an external apparatus connected to the spectroscopic camera so that they can communicate with each other.

The storage section 24 stores the captured spectroscopic image. The storage section 24 further stores a variety of data and programs for controlling the spectroscopic camera 1.

Optical Characteristics of Wavelength Tunable Interference Filter

Optical characteristics of the wavelength tunable interference filter 5 in the spectroscopic camera 1 described above will next be described with reference the drawings.

Figure 5:
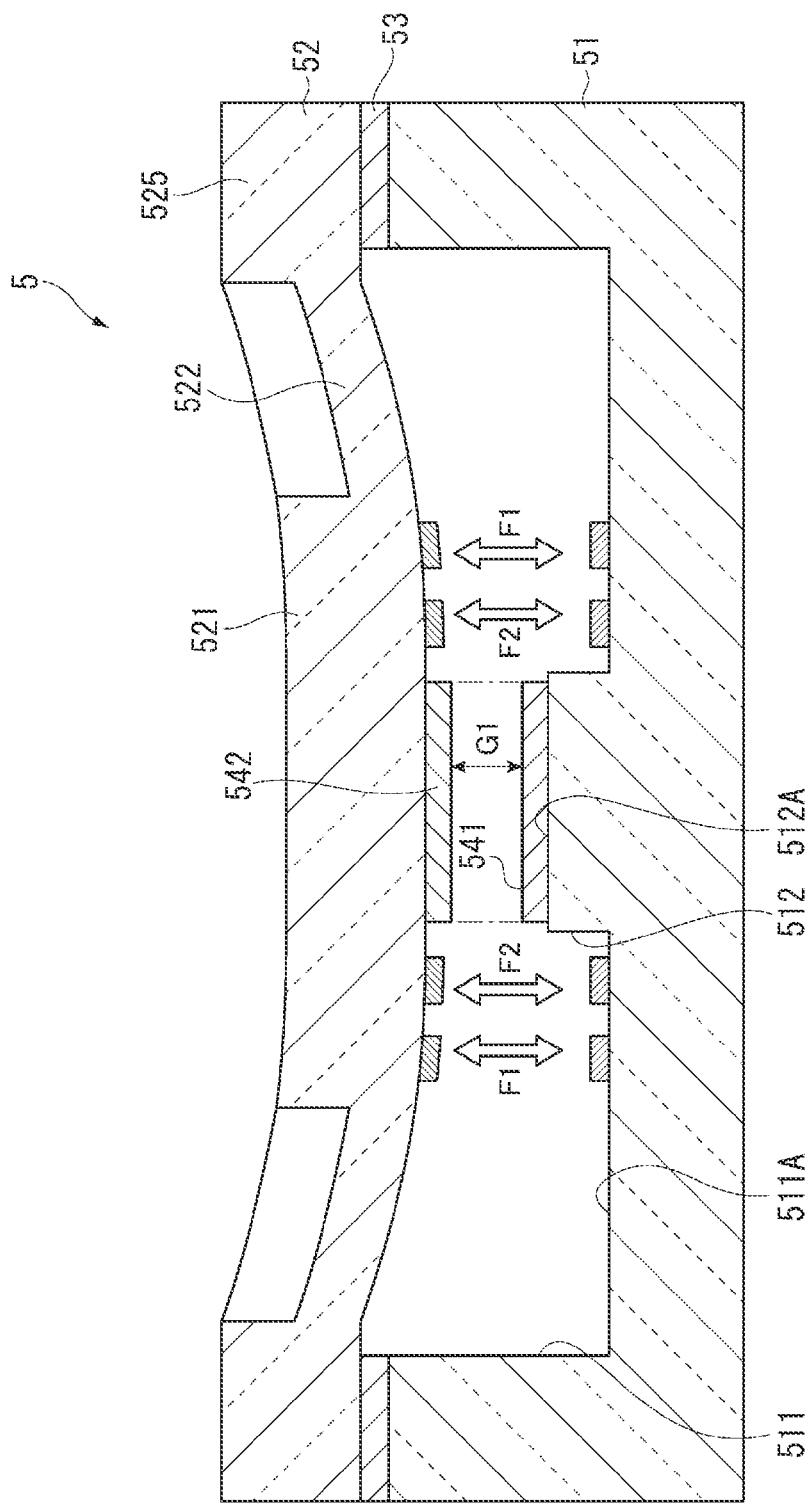
FIG. 5 is a cross-sectional view showing that a gap in the wavelength tunable interference filter shown in FIG. 2 is changed.
Figure 6:
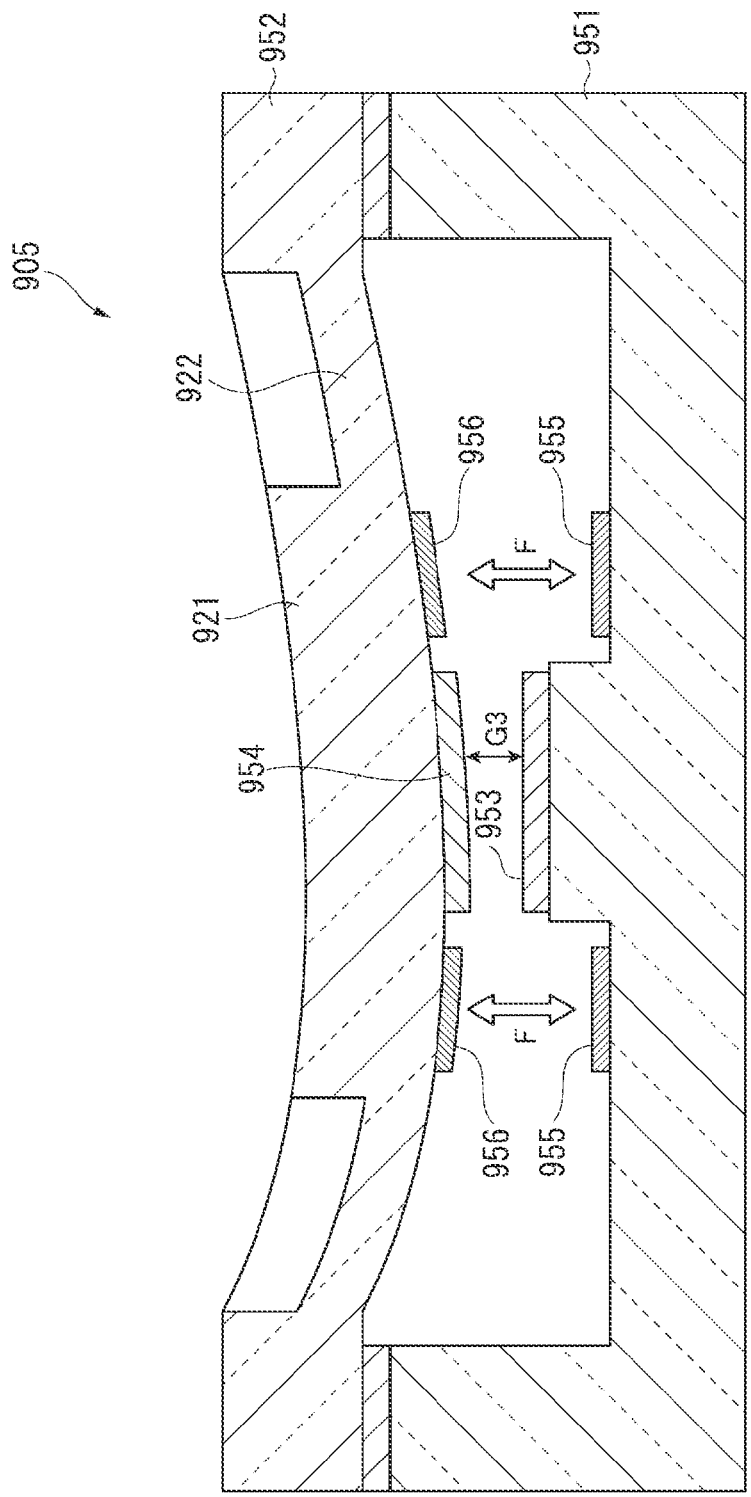
FIG. 6 is a cross-sectional view showing that a gap in a wavelength tunable interference filter having a configuration of related art is changed.

FIG. 5 is a cross-sectional view showing a state in which the inter-reflection-film gap G1 in the wavelength tunable interference filter 5 according to the embodiment of the invention is changed. FIG. 6 is a cross-sectional view showing a state in which an inter-reflection-film gap G3 in a wavelength tunable interference filter 905 having a configuration of related art is changed.

In general, in the wavelength tunable interference filter 905 having a configuration of related art shown in FIG. 6, to set the inter-reflection-film gap G3 between a fixed reflection film 953 provided on a fixed substrate 951 and a movable reflection film 954 provided on a movable substrate 952, a voltage is applied between a first electrode 955 and a second electrode 956. The voltage application produces an electrostatic attractive force F, which causes the movable substrate 951 to bend toward the fixed substrate 951. That is, the movable substrate 952 is bent so that the inter-reflection-film gap G3 decreases.

In this process, the voltage application between the first electrode 955 and the second electrode 956 may cause a movable portion 921 to bend but incline at the same time, resulting in deterioration in the parallelism of the movable reflection film 954 with respect to the fixed reflection film 953 in some cases.

The deterioration in the parallelism between the reflection films facing each other described above may be caused by inclination of the movable portion 921 and the movable reflection film 954 present at the time of manufacture and inclination thereof caused at the time of drive operation resulting from unevenness in the thickness and rigidity of a holding portion 922.

When the parallelism between the reflection films 953 and 954 facing each other deteriorates as described above, the size of the gap between the reflection films varies thereacross, resulting in variation in transmission spectrum. In this case, for example, when entire light having passed through the reflection films is received in single operation (when light having undergone two-dimensional spectral operation is received), a broad transmission spectrum is obtained, which means that the filter characteristics have poor wavelength resolution. On the other hand, when the light having passed through the reflection films is divided into light fluxes and a plurality of pixels of the imaging section 12 receive the divided light fluxes, the peak wavelength in the transmission spectrum varies pixel by pixel, undesirably resulting in improper spectroscopic image acquisition.

In contrast, in the wavelength tunable interference filter 5 according to the present embodiment, the second electrostatic actuator 56 for maintaining the parallelism between the fixed reflection film 541 and the movable reflection film 542 is provided, and the second electrostatic actuator 56 includes the second electrostatic sub-actuators 56A, 56B, and 56C, which can be driven independently of each other. The voltage controller 15 in the optical module 10 can apply a first drive voltage set for each of the second electrostatic sub-actuators 56A, 56B, and 56C to satisfactorily maintain the parallelism between the fixed reflection film 541 and the movable reflection film 542. A description will be made of an optical module drive method for changing the dimension of the inter-reflection-film gap G1 while performing the inclination control.

Optical Module Drive Method

The first step is to determine how the wavelength tunable interference filter 5 and the voltage controller 15 are connected to each other when they are assembled into the optical module 10 and what voltage waveform is assigned to which second electrostatic sub-actuator. Specifically, consider the wavelength tunable interference filter 5 immediately after it is manufactured but before assembled into the optical module 10, and measure the inclination of the movable reflection film 542 caused when the same drive voltage is applied to all drive electrodes. The measurement determines the direction and the amount of inclination of the movable reflection film 542, and the first drive voltages to be applied to the second electrostatic sub-actuators 56A, 56B, and 56C are determined based on the direction and the amount of inclination.

In the present embodiment, the spectroscopic camera 1 acquires spectroscopic images of a plurality of preset target wavelengths. Further, in the wavelength tunable interference filter 5 according to the present embodiment, an electrostatic attractive force F1 produced by the second electrostatic actuator 56 changes the dimension of the inter-reflection-film gap approximately to a target gap dimension corresponding to each of the target wavelengths described above, and then the first electrostatic actuator 55 is used to further allow the dimension of the inter-reflection-film gap to approach the target gap dimension with precision. The first drive voltages described above to be applied to the second electrostatic sub-actuators 56A, 56B, and 56C are therefore determined so that the reflection films 541 and 542 are maintained parallel to each other when the second electrostatic actuator 56 is used to change the dimension of the inter-reflection-film gap approximately to the target gap dimension. Further, the first drive voltages described above are determined for each of the plurality of target wavelengths. The first drive voltages having been set for each of the second electrostatic sub-actuators 56A, 56B, and 56C are stored as the V-λ data in the storage section in the microcomputer 154 with the first drive voltages related to the target wavelengths.

Next, to actually capture a spectroscopic image for each of the wavelengths by using the spectroscopic camera 1, the control unit 20 first instructs the wavelength setting section 21 to set a target wavelength of light that is allowed to pass through the wavelength tunable interference filter 5 (target wavelength setting step). The wavelength setting section 21 then outputs a control signal to the voltage controller 15 to cause the wavelength tunable interference filter 5 to transmit light of the set target wavelength.

When the control signal is inputted from the control unit 20, the microcomputer 154 in the voltage controller 15 acquires the first drive voltages corresponding to the target wavelength based on the V-λ, data (first drive voltage acquisition step).

Figure 7A:
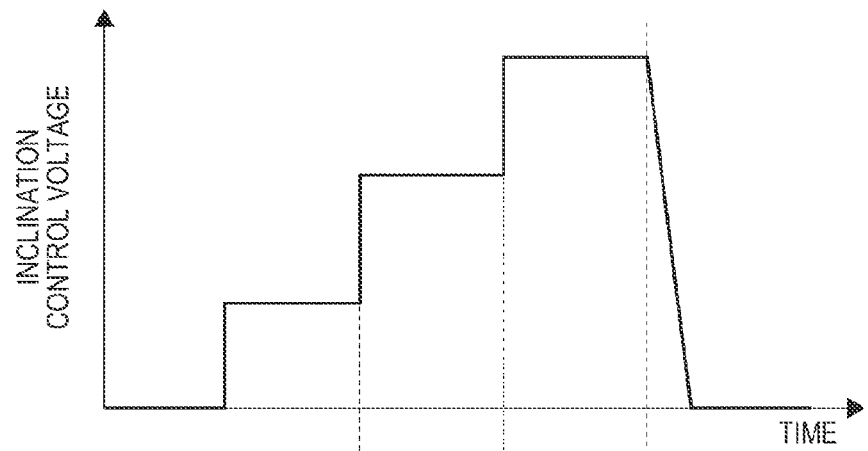
FIGS. 7A to 7C show examples of the waveform of an applied voltage, FIG. 7A showing an example of the voltage waveform of a first drive voltage applied to part of second electrostatic sub-actuators, FIG. 7B showing an example of the voltage waveform of the first drive voltage applied to the remaining second electrostatic sub-actuators, and FIG. 7C showing an example of the voltage waveform of a feedback voltage applied to a first electrostatic actuator.
Figure 7B:
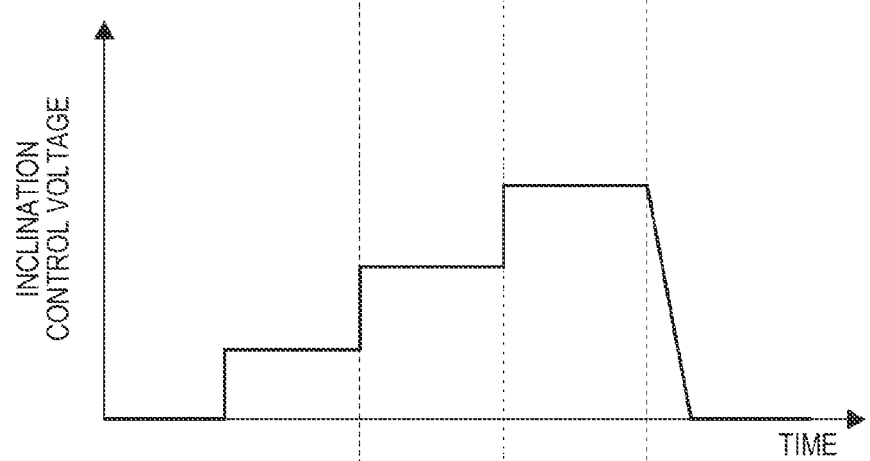
Figure 7C:

FIGS. 7A to 7C show examples of the waveform of the voltage applied to each of the actuators. FIG. 7A shows an example of the voltage waveform of the first drive voltage applied to the second electrostatic sub-actuators 56A and 56B. FIG. 7B is a waveform diagram showing an example of the voltage waveform of the first drive voltage applied to the second electrostatic sub-actuator 56C. FIG. 7C shows an example of the voltage waveform of the second drive voltage applied to the first electrostatic actuator 55.

FIGS. 7A to 7C show a case where a light transmission band is divided into three stages and swept by changing the gap three times in correspondence with the three stages. FIGS. 7A to 7C present the case where the light transmission band is divided into three stages byway of example, but a case where the light transmission band is divided into a greater number of stages followed by the same setting and driving processes can be employed. As described above, the drive voltage is determined in advance so that the parallelism between the reflection films is always maintained through the three stages.

The microcomputer 154 outputs an inclination control signal based on the first drive voltages calculated in a first drive voltage acquisition step to the first drive circuit 151.

In the present embodiment, first drive voltages having two types of voltage waveforms are applied to the sub-drivers.

The first drive circuit 151 therefore applies the calculated first drive voltages to the second electrostatic actuator 56 (first drive voltage application step). This step allows the electrostatic attractive force F1 based on each of the first drive voltages to act in the space between the fixed reflection film 541 and the movable reflection film 542 to improve the parallelism between the fixed reflection film 541 and the movable reflection film 542 and displace the movable portion 521 toward the fixed substrate 51.

The second drive circuit 153 then performs feedback control.

In the feedback control, the microcomputer 154 applies a high-frequency voltage signal between the fixed reflection film 541 and the movable reflection film 542 to detect capacitance therebetween by using the gap detection device 152. The voltage signal for capacitance detection has a voltage having a frequency sufficiently higher than that of the first drive voltages in order to prevent the electrostatic attractive force to vary due to the capacitance detection signal.

A detection signal according to the capacitance between the fixed reflection film 541 and the movable reflection film 542 is thus inputted to the gap detection device 152 (inter-reflection-film gap detection step). The gap detection device 152 uses a circuit using, for example, a coupling capacitor to acquire a voltage signal for capacitance detection as the detection signal. The detection signal is a signal based on the size of the inter-reflection-film gap G1. The fact that the gap detection device 152 has acquired the detection signal therefore means that the gap detection device 152 detects the size of the inter-reflection-film gap G1.

The gap detection device 152 then outputs the inputted detection signal to the second drive circuit 153.

On the other hand, when the control signal is inputted from the control unit 20, the microcomputer 154 calculates a target gap size corresponding to the target wavelength, acquires a detection signal corresponding to the target gap size (target detection signal) from the gap correlation data stored in the storage section, and outputs the acquired detection signal to the second drive circuit 153.

The second drive circuit 153 then calculates the difference between the target detection signal inputted from the microcomputer 154 and the detection signal inputted from the gap detection device 152 (difference calculation step) and judges whether or not the difference is "0" (difference judgment step).

When it is determined in the difference judgment step that the difference is not "0", the second drive circuit 153 sets a second drive voltage in accordance with the difference and applies the set second drive voltage to the first electrostatic actuator 55 (second drive voltage application step).

In the second drive voltage application step, the second drive circuit 153 sets the second drive voltage to be applied to the first electrostatic actuator 55 based on the difference between the target value signal inputted from the microcomputer 154 and the signal outputted from the gap detection device 152 in such a way that the difference is 0. At this point, in the present embodiment, the first drive voltages are applied to the second electrostatic actuator 56 so that the first electrostatic actuator 55 operates at substantially fixed sensitivity. The first electrostatic actuator 55 can therefore be driven so that it operates at low sensitivity irrespective of the amount of displacement of the movable portion 521 (the amount of change in the inter-electrode gap G2).

After the second drive voltage application step, the control returns to the gap detection step. That is, the voltage controller 15 repeatedly carries out the processes in the gap detection step to the second drive voltage application step until it is judged in the difference judgment step that the difference is "0".

When it is judged in the difference judgment step that the difference is "0", the spectroscopic image acquisition section 22 in the control unit 20 of the spectroscopic camera 1 captures a spectroscopic image produced by the imaging section 12 that captures the light having passed through the wavelength tunable interference filter 5 and stores the stereoscopic image in the storage section 24 (image capturing step). The stereoscopic image of the target wavelength set by the wavelength setting section 21 in the control unit 20 can thus be captured.

The above description has been made of the process of extracting light of a single wavelength through the wavelength tunable interference filter 5 and detecting the amount of extracted light. For example, when the optical spectrum of light under measurement is measured based on the amount of light of each wavelength within a predetermined wavelength range contained in the light under measurement, the wavelength may be successively changed and set and the steps described above may be repeated.

Advantageous Effects of Present Embodiment

In the present embodiment, the voltage controller 15 applies a first drive voltage set for each of the sub-drivers. The application of the thus set voltages allows the sub-drivers to produce different magnitudes of force in such a way that the parallelism between the fixed reflection film 541 and the movable reflection film 542 is maintained. As a result, deterioration in the parallelism between the reflection films 541 and 542 resulting, for example, from unevenness in the thickness of each of the substrates in the wavelength tunable interference filter 5 can be eliminated. The inter-reflection-film gap G1 can therefore be changed with the reflection films 541 and 542 maintained parallel to each other with precision, whereby high-wavelength-resolution light, that is, light of a wavelength having a small half-width value can be extracted.

Further, since the inter-reflection-film gap G1 can be controlled with the reflection films 541 and 542 maintained parallel to each other with precision, the precision in wavelength increases in two-dimensional spectrometry. As a result, when the spectroscopic camera 1 captures a stereoscopic image of a predetermined target wavelength, each pixel in the imaging section 12 can receive light of the same wavelength, whereby a precise stereoscopic image can be acquired.

In the present embodiment, after the first driver is used to change the gap dimension by a predetermined value, the feedback voltage to be applied to the second driver is set based on a detected gap dimension and then applied to the second driver.

That is, in the embodiment of the invention, a target gap dimension is first set, the first driver changes the gap dimension to a value close to the target gap dimension, and the second driver is used to make fine adjustment of the remaining gap dimension based on the gap dimension detected by the gap detection section.

In the configuration described above, since the second drive voltage applied to the second driver is set based on the gap dimension that is always close to the target gap dimension, the second driver only needs to produce a force within a small range of magnitude, whereby the second driver can produce a force at low sensitivity to the second drive voltage applied thereto.

Fine adjustment of the gap dimension can therefore be made with precision at the time of the feedback control.

Further, since the fine adjustment of the gap dimension can be made with precision over a wide gap range with the gain of the second driver fixed, no component that allows the second driver to change the gain thereof is required, whereby the configuration can be simplified.

Moreover, when the gap dimension is changed by using only the second driver, the parallelism between the first reflection film and the second reflection film may deteriorate in relation to the changed amount of gap dimension. In the embodiment of the invention, however, since the first driver is used to change the gap dimension to a value close to a target gap dimension, the first reflection film and the second reflection film are maintained parallel to each other with precision after the gap dimension is changed to the target gap dimension, whereby high wavelength resolution is achieved irrespective of a target gap dimension.

In the present embodiment, the gap detector operates based on detection of the capacitance between the first reflection film and the second reflection film. In this configuration, in which the first reflection film and the second reflection film, which form an optical interference area, also serve as the gap detector, it is not necessary to separately provide electrodes for the gap detector, whereby the configuration can be simplified, resulting in a compact, thin wavelength tunable interference filter.

In the present embodiment, the sub-drivers are controlled by application of the first drive voltages having two types of voltage waveforms to the sub-drivers. In this configuration, for example, when the number of sub-drivers is three, a large first drive voltage can be applied to two of the sub-drivers and a small first drive voltage can be applied to the remaining sub-driver to change the inclination of the reflection film on the movable portion. The electrode to which the small first drive voltage is applied may be selected by checking the actual inclination direction of the reflection film on the movable portion in an inspection before shipment, and the first drive voltages may be set in accordance with the amount of inclination. As described above, since the sub-drivers are controlled by the first drive voltages having two types of voltage waveforms, the configuration of a control system (such as circuit for voltage control) used in the voltage controller can be simplified.

In the present embodiment, each of the first driver and the second driver is formed of an electrostatic actuator. In this configuration, only electrodes facing each other need to be provided, whereby the configuration can be simplified, resulting in a compact, thin optical module. Further, the inter-reflection-film gap can be readily changed only by changing the voltage applied between the electrodes, whereby the inter-reflection-film gap can be also readily controlled.

In the present embodiment, the first driver is provided in a region outside the second driver in a plan view. In this configuration, an adjustment range over which the parallelism between the reflection films is changed can be wider than in a configuration in which the first driver is disposed in a region inside the second driver, whereby deterioration in the parallelism between the reflection films can be precisely eliminated.

In the present embodiment, the plurality of sub-drivers are disposed in an arcuate form along the circumference of the imaginary circle P at equal angular intervals therealong. In this configuration, the arrangement of the plurality of sub-drivers disposed at equal angular intervals allows electrostatic attractive forces to act in a satisfactorily balanced manner with respect to the center point O. As a result, even when the parallelism deteriorates in any position in the optical interference area, the deterioration in the parallelism can be eliminated by applying appropriate first drive voltages in accordance with the position where the parallelism has deteriorated.

Second Embodiment

A second embodiment according to the invention will be described below.

In the first embodiment described above, first drive voltages having two types of voltage waveforms are applied to the sub-drivers. The second embodiment differs from the first embodiment in that one of the first drive voltages having two types of voltage waveforms has a reference potential waveform (GND potential).

In the present embodiment, the first drive circuit 151 only needs to have one drive circuit. For example, among the second electrostatic sub-actuators 56A, 56B, and 56C, when the second electrostatic sub-actuators 56A and 56B are driven, but the second electrostatic sub-actuator 56C is not driven, the second electrostatic sub-actuators 56A and 56B are connected to the drive circuit that applies a first drive voltage having a set waveform. On the other hand, the second electrostatic sub-actuator 56C may be connected, for example, to a GND circuit.

In the thus configured present embodiment, since the first drive circuit 151 can be configured so that it has one drive circuit, the configuration of the voltage controller 15 can be simplified, whereby the size and the manufacturing cost of the optical module 10 can be reduced. Further, no mechanical or electrical interference occurs unlike a case where a plurality of control systems (such as drive circuits) are provided.

When any of the second electrostatic sub-actuators 56A, 56B, and 56C is not driven as in the present embodiment, unlike the first embodiment described above, the drive method in which a target gap dimension is first set and the first driver changes the gap dimension to a value close to the target gap dimension is not used. Instead, a drive method in which the first driver only performs the inclination control is preferably used.

In this case, it is preferable that a first drive voltage is applied to the first driver to control the inclination of the movable reflection film with respect to the fixed reflection film for improvement in the parallelism therebetween and a voltage is applied to the electrostatic actuator 56 to change the gap dimension.

Third Embodiment

A third embodiment according to the invention will be described below.

In the first embodiment described above, first drive voltages having two types of voltage waveforms are applied to the sub-drivers. The third embodiment differs from the first embodiment described above in that first drive voltages having three types of voltage waveforms are applied to the sub-drivers.

In the present embodiment, for example, a first drive voltage having the voltage waveform shown in FIG. 7A is applied to the second electrostatic sub-actuator 56A, a first drive voltage having the voltage waveform shown in FIG. 7B is applied to the second electrostatic sub-actuator 56B, and a first drive voltage having the reference potential waveform, that is, a non-drive waveform is applied to the second electrostatic sub-actuator 56C as in the case of the second electrostatic sub-actuator 56C in the second embodiment.

Figure 8A:
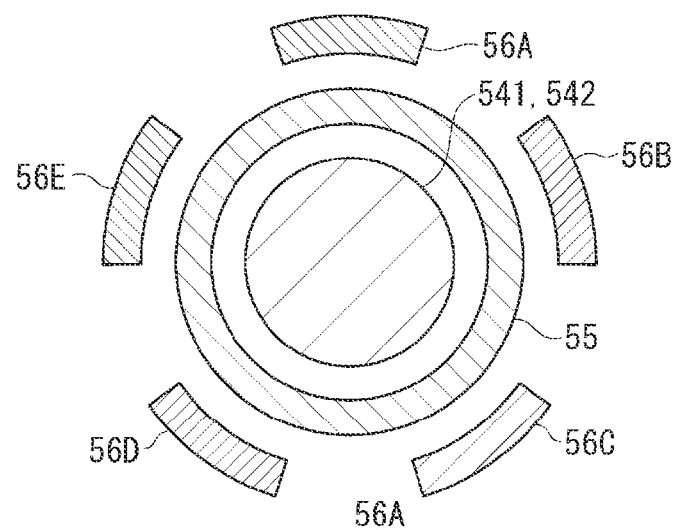
FIGS. 8A to 8C show electrode arrangements in a wavelength tunable interference filter of a third embodiment, FIG. 8A showing an arrangement in which five sub-drivers are provided, FIG. 8B showing an arrangement in which six sub-drivers are provided, and FIG. 8C showing an arrangement in which three sub-drivers are provided in each of annular shapes that form a double annular shape.
Figure 8B:
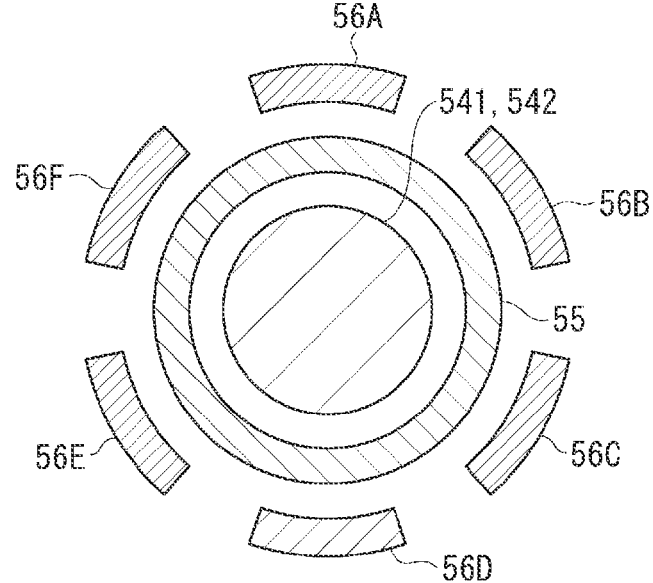
Figure 8C:
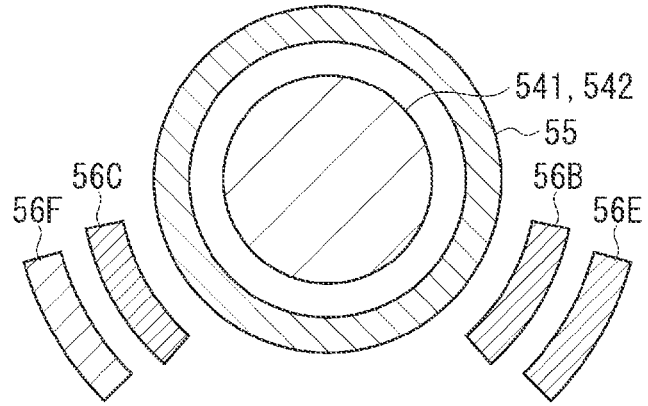

Further, the configuration and arrangement pattern of the second electrode 561 and the fourth electrode 562, which form the first driver, are not limited to the configuration and the arrangement pattern in the first embodiment described above, in which the three second sub-electrodes 561A, 561B, and 561C and the three fourth sub-electrodes 562A, 562B, and 562C are disposed at 120-degree equal angular intervals. A variety of other configurations and arrangement patterns can instead be employed. FIGS. 8A to 8C show some examples. FIG. 8A shows a configuration in which five second sub-electrodes and five fourth sub-electrodes are arranged at 72-degree equal angular intervals. FIG. 8B shows a configuration in which six second sub-electrodes and six fourth sub-electrodes are arranged at 60-degree equal angular intervals. FIG. 8C shows a configuration in which second sub-electrodes and fourth sub-electrodes form a double annular shape and three second sub-electrodes and three fourth sub-electrodes are arranged at 120-degree equal angular intervals in the respective annular shapes.

In the present embodiment, one of the first drive voltages having three types of voltage waveforms has the reference potential waveform, that is, the non-drive waveform. In this configuration, the sub-drivers are controlled by first drive voltages having two types of voltage waveforms in an actual sense, which means that two control systems (drive circuits) are used in the first driver, whereby deterioration in the parallelism between the reflection films can be eliminated with greater precision. For example, when the number of sub-drivers is five, the following voltage application can, for example, be employed: The non-drive voltage is applied to one of the sub-drivers; a small first drive voltage is applied to another sub-driver; and a large first drive voltage is applied to the remaining three sub-drivers. As a result, light of a desired wavelength can be extracted through the wavelength tunable interference filter with high precision. Further, since the sub-drivers are controlled by using the first drive voltages having two types of voltage waveforms, the number of control systems (such as drive circuits) used in the voltage controller can be reduced.

When any of the sub-drivers is not driven as in the present embodiment, unlike the first embodiment described above, the drive method in which a target gap dimension is first set and the first driver changes the gap dimension to a value close to the target gap dimension is not used. Instead, a drive method in which the first driver only performs the inclination control is preferably used.

Other Embodiments

The invention is not limited to the embodiments described above, and variations, improvements, and other modifications fall within the scope of the invention to the extent that they achieve the advantage of some aspects of the invention.

For example, in each of the embodiments described above, the three second electrostatic sub-actuators 56A, 56B, and 56C are arranged at 120-degree intervals by way of example as shown in FIG. 3, but the arrangement is not limited thereto.

FIGS. 8A to 8C show examples of the arrangement of the sub-drivers in embodiments of the invention. FIG. 8A shows a configuration in which five second electrostatic sub-actuators 56A, 56B, 56C, 56D, and 56E are arranged at 72-degree equal angular intervals. FIG. 8B shows a configuration in which six second electrostatic sub-actuators 56A, 56B, 56C, 56D, 56E, and 56F are arranged at 60-degree equal angular intervals. FIG. 8C shows a configuration in which sub-drivers are arranged in a double annular shape and second electrostatic sub-actuators 56A, 56B, and 56C and second electrostatic sub-actuators 56D, 56E, and 56F are arranged at 120-degree equal angular intervals along the annular shape on the internal diameter side and the annular shape on the outer diameter side, respectively.

As shown in FIGS. 8A to 8C, providing a greater number of sub-drivers allows the parallelism between the reflection films 541 and 542 to be controlled with higher precision, whereby a decrease in wavelength resolution that occurs when the dimension of the inter-reflection-film gap G1 is changed can be more reliably suppressed.

Further, in the third embodiment, the first drive voltage applied to each of the second electrostatic sub-actuators 56A, 56B, and 56C is set at any one of the three voltage waveforms but the first drive voltage applied to one of the sub-actuators (second electrostatic sub-actuator 56C) has the non-drive waveform (GND potential) by way of example. The second electrostatic sub-actuator 56C may instead be driven by using a drive waveform different from those for the second electrostatic sub-actuators 56A and 56B.

Moreover, as shown in FIGS. 8A to 8C, in a configuration in which four or more second electrostatic sub-actuators are provided, it is desirable to incorporate a control system that can output four or more voltage waveforms different from each other in the first drive circuit 151. In this case, finer inclination control can be performed, whereby the parallelism between the reflection films 541 and 542 can be maintained with higher precision.

The second electrostatic actuator 56 is presented as an example of the first driver according to an embodiment of the invention, and the first electrostatic actuator 55 is presented as an example of the first driver according to an embodiment of the invention. Each of the first and second drivers may be formed of a drive system other than an electrostatic actuator.

For example, each of the first and second drivers may be an induction actuator having an induction coil provided therein instead of electrodes or may be a piezoelectric actuator.

Further, the fixed reflection film 541 and the movable reflection film 542 form electrodes for capacitance detection by way of example, but the reflection films are not necessarily configured this way. In addition to the reflection films 541 and 542, electrodes for capacitance detection may be separately provided. In this case, disposing the electrodes for capacitance detection in the vicinity of the reflection films 541 and 542 allows a detection signal corresponding to the dimension of the inter-reflection-film gap to be outputted.

In the embodiments described above, the second electrostatic actuator 56, which is the first driver, is used not only to control the inclination of the reflection films 541 and 542 but also to change the dimension of the inter-reflection-film gap G1 by way of example. For example, the second electrostatic actuator 56 may be used only to control the inclination of the reflection films 541 and 542, and only the first electrostatic actuator 55 may be used to change the dimension of the inter-reflection-film gap G1.

Moreover, in the embodiments described above, the second electrostatic actuator 56, which is the first driver, is disposed in a position farther away from the reflection films 541 and 542 than the first electrostatic actuator 55, that is, in a region outside the first electrostatic actuator 55 by way of example. The second electrostatic actuator 56, which is the first driver, may be disposed in a region inside the first electrostatic actuator 55.

Further, in the embodiments described above, the movable substrate 52 is provided with the holding portion 522 formed, for example, of a diaphragm by way of example, but the holding portion 522 may be omitted. In this case as well, the parallelism between the reflection films 541 and 542 deteriorates in some cases when the dimension of the inter-reflection-film gap G1 is changed due to unevenness in substrate thickness of the movable substrate 52, film stress induced in the movable reflection film 542 provided on the movable substrate 52 and the variety of electrodes and bonding films, and other factors, such as external pressure. In this configuration, providing the first driver and the voltage controller according to any of the embodiments of the invention allows improvement in the parallelism between the reflection films 541 and 542, whereby a decrease in wavelength resolution can be suppressed, as in the embodiments described above.

In each of the embodiments described above, the spectroscopic camera 1 is presented as the electronic apparatus according to an embodiment of the invention by way of example. In addition, the optical module and the electronic apparatus according to the embodiments of the invention are applicable to a variety of fields.

Figure 9:
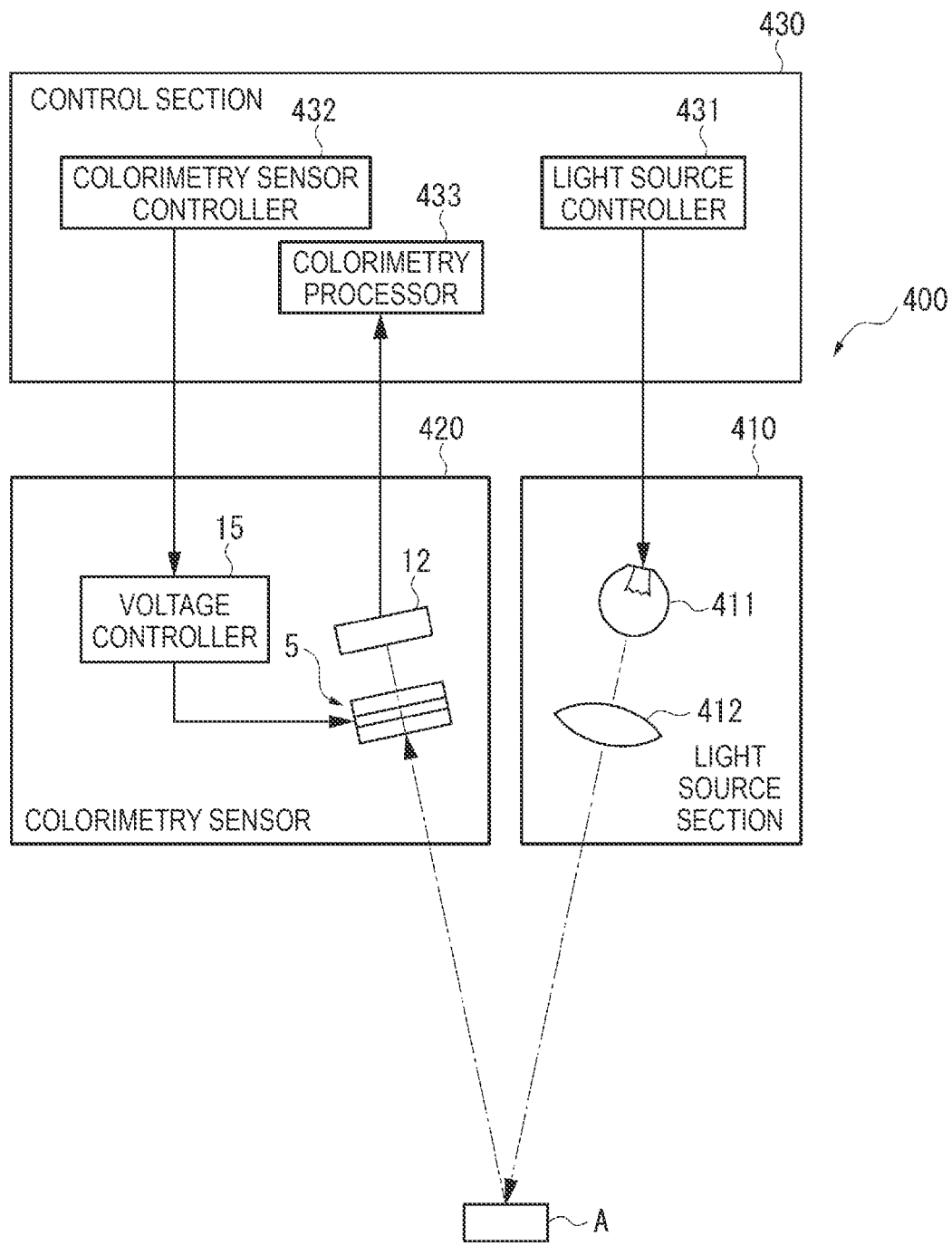
FIG. 9 is a schematic view showing a spectroscopic colorimetry apparatus (electronic apparatus) including the wavelength tunable interference filter of any of the embodiments according to the invention.

For example, the electronic apparatus according to any of the embodiments of the invention is applicable to a spectroscopic colorimetry apparatus for color measurement and spectrometry, as shown in FIG. 9.

FIG. 9 is a block diagram showing an example of a spectroscopic colorimetry apparatus 400 including a wavelength tunable interference filter.

The spectroscopic colorimetry apparatus 400 includes a light source section 410, which outputs light toward an object A under inspection, a colorimetry sensor 420 (optical module), and a control section 430 (processor), which controls overall action of the spectroscopic colorimetry apparatus 400, as shown in FIG. 9. The spectroscopic colorimetry apparatus 400 operates as follows: The light outputted from the light source section 410 is reflected off the object A under inspection; the colorimetry sensor 420 receives the reflected light under inspection; and the chromaticity of the light under inspection, that is, the color of the object A under inspection is analyzed and measured based on a detection signal outputted from the colorimetry sensor 420.

The light source section 410 includes a light source 411 and a plurality of lenses 412 (FIG. 9 shows only one of them) and outputs, for example, reference light (white light, for example) toward the objet A under inspection. The plurality of lenses 412 may include a collimator lens. In this case, in the light source section 410, the collimator lens parallelizes the reference light emitted from the light source 411, and the parallelized reference light exits through a projection lens (not shown) toward the objet A under inspection. In the present embodiment, the spectroscopic colorimetry apparatus 400 including the light source section 410 is presented by way of example, but the light source section 410 may not be provided, for example, when the objet A under inspection is a liquid crystal panel or any other light emitting member.

The colorimetry sensor 420 includes the wavelength tunable interference filter 5, the imaging section 12, which receives the light having passed through the wavelength tunable interference filter 5, and the voltage controller 15, which controls the voltages applied to the first electrostatic actuator 56 and the second electrostatic actuator 56 in the wavelength tunable interference filter 5, as shown in FIG. 9. The colorimetry sensor 420 further includes an optical lens for incident light (not shown) that is located a position facing the wavelength tunable interference filter 5 and guides the reflected light reflected off the objet A under inspection (light under inspection) into the colorimetry sensor 420. In the colorimetry sensor 420, the wavelength tunable interference filter 5 separates light of a predetermined wavelength from the light under inspection incident through the optical lens for incident light, and the imaging section 12 receives the separated light.

The control section 430 controls overall action of the spectroscopic colorimetry apparatus 400.

The control section 430 can, for example, be a general-purpose personal computer, a personal digital assistant, or a computer dedicated for colorimetry. The control section 430 includes a light source controller 431, a colorimetry sensor controller 432, and a colorimetry processor 433, as shown in FIG. 9.

The light source controller 431 is connected to the light source section 410 and outputs a predetermined control signal based, for example, on a user's setting input to the light source section 410 to cause it to emit white light of predetermined luminance.

The colorimetry sensor controller 432 is connected to the colorimetry sensor 420, sets the wavelength of light to be received with the colorimetry sensor 420 based, for example, on a user's setting input, and outputs an instruction signal to the colorimetry sensor 420 to cause it to detect the amount of light of the thus set wavelength. The voltage controller 15 in the colorimetry sensor 420 then applies voltages to the first electrostatic actuator 56 and the second electrostatic actuator 56 based on the control signal to drive the wavelength tunable interference filter 5.

The colorimetry processor 433 analyzes the chromaticity of the objet A under inspection based on the received amount of light detected by the imaging section 12.

Another example of the electronic apparatus according to any of the embodiments of the invention may be a light-based system for detecting presence of a specific substance. Examples of such a system may include an on-vehicle gas leakage detection device that employs a spectrometric measurement method using a wavelength tunable interference filter, an optoacoustic rare gas detection device for respiratory detection, and other gas detection apparatus.

An example of such a gas detection apparatus will be described below with reference to the drawings.

Figure 10:
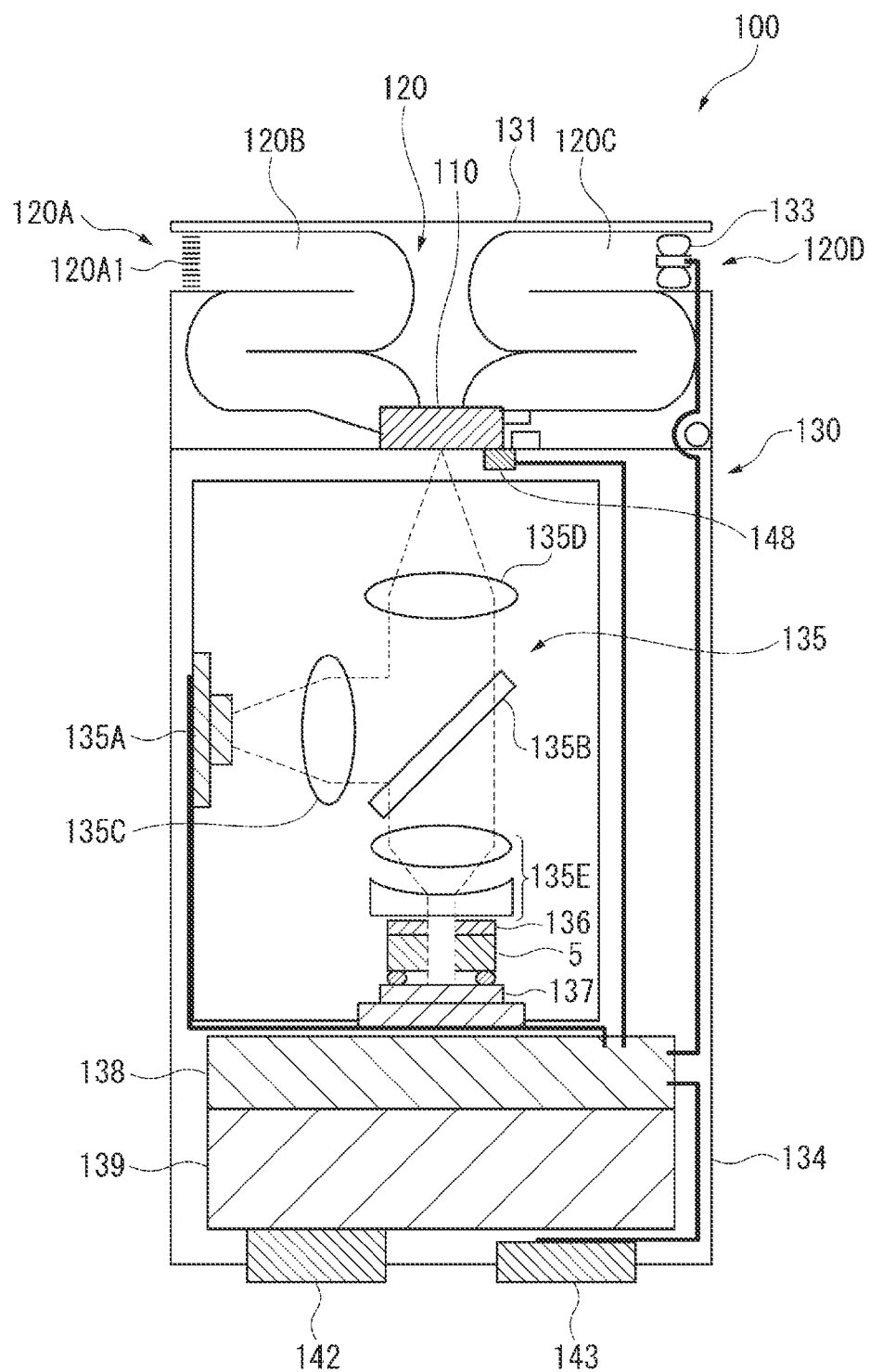
FIG. 10 is a schematic view showing a gas detection apparatus (electronic apparatus) including the wavelength tunable interference filter of any of the embodiments according to the invention.

FIG. 10 is a schematic view showing an example of a gas detection apparatus including a wavelength tunable interference filter.

Figure 11:
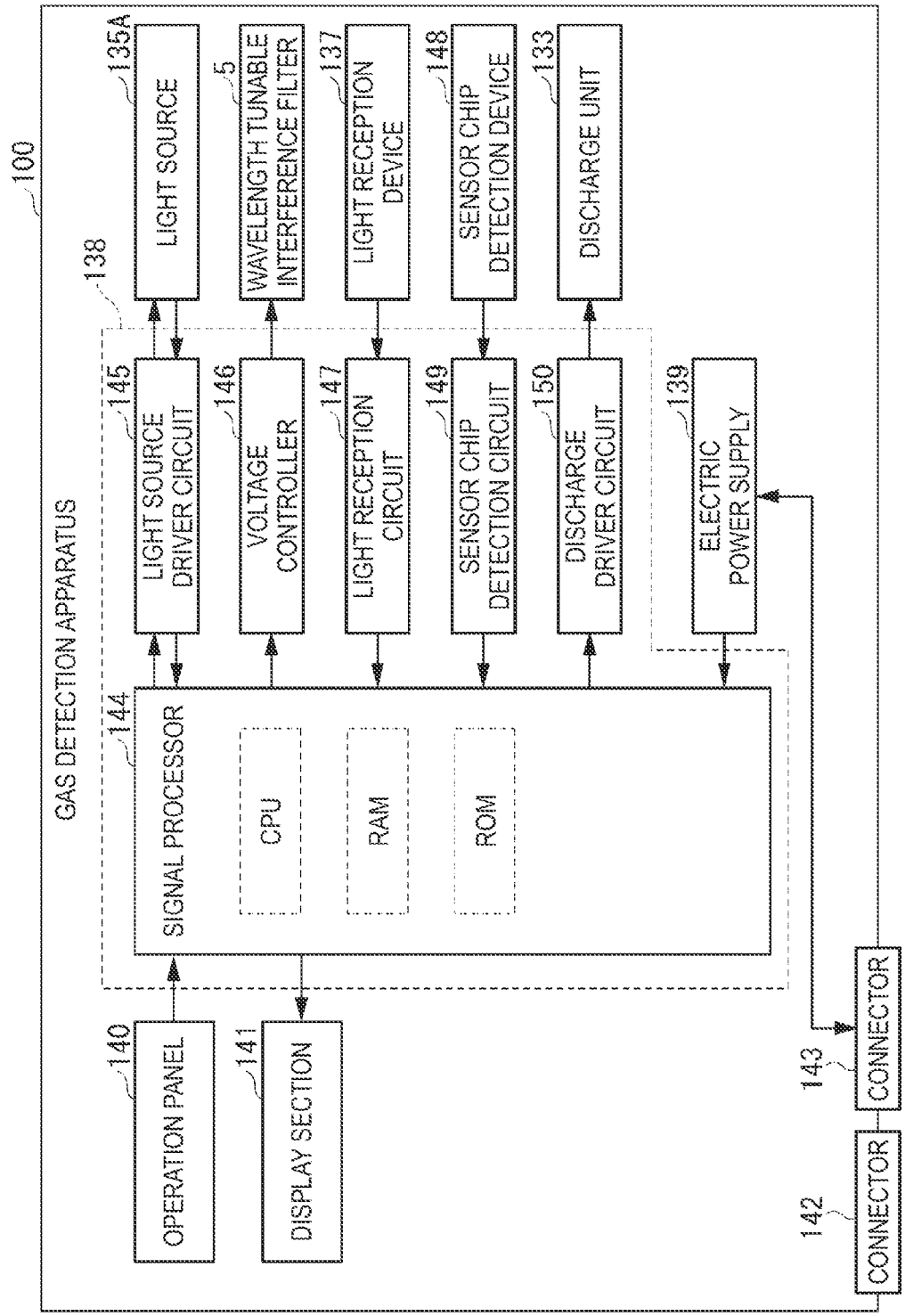
FIG. 11 is a block diagram showing the configuration of a control system of the gas detection apparatus shown in FIG. 10.

FIG. 11 is a block diagram showing the configuration of a control system of the gas detection apparatus shown in FIG. 10.

A gas detection apparatus 100 includes a sensor chip 110, a channel 120 having a suction port 120A, a suction channel 120B, a discharge channel 120C, and a discharge port 120D, and a main body 130, as shown in FIG. 10.

The main body 130 includes a sensor unit cover 131 having an opening through which the channel 120 can be attached and detached, a discharge unit 133, an enclosure 134, an optical unit 135, a filter 136, the wavelength tunable interference filter 5, a detection unit including a light reception device 137 (detection section), a control unit 138, which processes a detected signal and controls the detection section, and an electric power supply 139, which supplies electric power. The optical unit 135 includes a light source 135A, which emits light, a beam splitter 135B, which reflects the light incident from the light source 135A toward the sensor chip 110 whereas transmitting light incident from the sensor chip side toward the light reception device 137, and lenses 135C, 135D, and 135E.

On the exterior surface of the gas detection apparatus 100 are provided an operation panel 140, a display section 141, a connector 142 for external interfacing, and the electric power supply 139, as shown in FIG. 11. When the electric power supply 139 is a secondary battery, a connector 143 for charging purposes may be further provided.

Further, the control unit 138 in the gas detection apparatus 100 includes a signal processor 144, which is formed of a CPU or any other component, a light source driver circuit 145, which controls the light source 135A, a voltage controller 146, which controls the wavelength tunable interference filter 5, a light reception circuit 147, which receives a signal from the light reception device 137, a sensor chip detection circuit 149, which receives a signal from a sensor chip detection device 148, which reads a code of the sensor chip 110 and detects whether or not the sensor chip 110 is present, and a discharge driver circuit 150, which controls the discharge unit 133, as shown in FIG. 11.

The action of the thus configured gas detection apparatus 100 will be described below.

The sensor chip detection device 148 is disposed inside the sensor unit cover 131 in an upper portion of the main body 130, and the sensor chip detection device 148 detects whether or not the sensor chip 110 is present. The signal processor 144, when it detects a detection signal from the sensor chip detection device 148, judges that the sensor chip 110 has been attached and provides the display section 141 with a display signal that causes the display section 141 to display information representing that detection action is ready.

For example, when a user operates the operation panel 140 and the operation panel 140 outputs an instruction signal representing start of detection to the signal processor 144, the signal processor 144 first outputs a light source activation signal to the light source driver circuit 145 to activate the light source 135A. Having been driven, the light source 135A emits single-wavelength, linearly polarized, stable laser light. Further, the light source 135A has a built-in temperature sensor and light amount sensor, which output information on the temperature and the amount of light to the signal processor 144. When the signal processor 144 judges that the light source 135A is operating in a stable manner based on the temperature and the amount of light inputted from the light source 135A, the signal processor 144 controls the discharge driver circuit 150 to activate the discharge unit 133. As a result, a gaseous specimen containing a target substance to be detected (gas molecule) is guided through the suction port 120A through the suction channel 120B, the sensor chip 110, and the discharge channel 120C to the discharge port 120D. The suction port 120A is provided with a dust removal filter 120A1, which removes relatively large dust, part of water vapor, and other substances.

The sensor chip 110 is a sensor that has a plurality of metal nano-structures incorporated therein and operates based on localized surface plasmon resonance. In the thus configured sensor chip 110, laser light incident thereon forms an enhanced electric field among the metal nano-structures. When a gas molecule enters the enhanced electric field, Raman scattered light carrying information on molecular vibration and Rayleigh scattered light are produced.

The Rayleigh scattered light and the Raman scattered light are incident through the optical unit 135 on the filter 136, which separates the Rayleigh scattered light out, and the Raman scattered light is incident on the wavelength tunable interference filter 5. The signal processor 144 then outputs a control signal to the voltage controller 146. The voltage controller 146 then activates the electrostatic actuators 55 and 56 in the wavelength tunable interference filter 5 as in the first embodiment described above to cause the wavelength tunable interference filter 5 to separate the Raman scattered light corresponding to the gas molecule under detection. Thereafter, having received the separated light, the light reception device 137 outputs a light reception signal according to the amount of received light to the signal processor 144 via the light reception circuit 147. In this case, target Raman scattered light can be precisely extracted through the wavelength tunable interference filter 5.

The signal processor 144 compares data on the spectrum of the thus obtained Raman scattered light corresponding to the gas molecule under detection with data stored in a ROM and judges whether or not the detected gas molecule is the target gas molecule to identify the substance. The signal processor 144 further displays information on the result of the identification on the display section 141 and outputs the information via the connector 142 to an external apparatus.

In FIGS. 10 and 11 described above, the gas detection apparatus 100, which performs gas detection based on Raman scattered light separated from incident light by the wavelength tunable interference filter 5, is presented by way of example, but a gas detection apparatus that identifies the type of gas by detecting light absorbance specific to the gas may instead be provided. In this case, a gas sensor that receives a gas flowing therein, separates light absorbed by the gas from incident light, and detects the separated light is used as the optical module according to an embodiment of the invention. A gas detection apparatus including the gas sensor that analyzes and identifies a gas that flows into the sensor can be considered as an electronic apparatus according to an embodiment of the invention. The configuration described above also allows gas component detection by using a wavelength tunable interference filter.

The system for detecting presence of a specific substance is not limited to the gas detection system described above. Another system for detecting presence of a specific substance can, for example, be a substance composition analyzer, such as a noninvasive measurement apparatus for measuring sugars based on near-infrared spectrometry and a noninvasive measurement apparatus for acquiring information on food, biological body, mineral, and other substances.

A food analyzer will be described below as an example of the substance composition analyzer described above.

Figure 12:
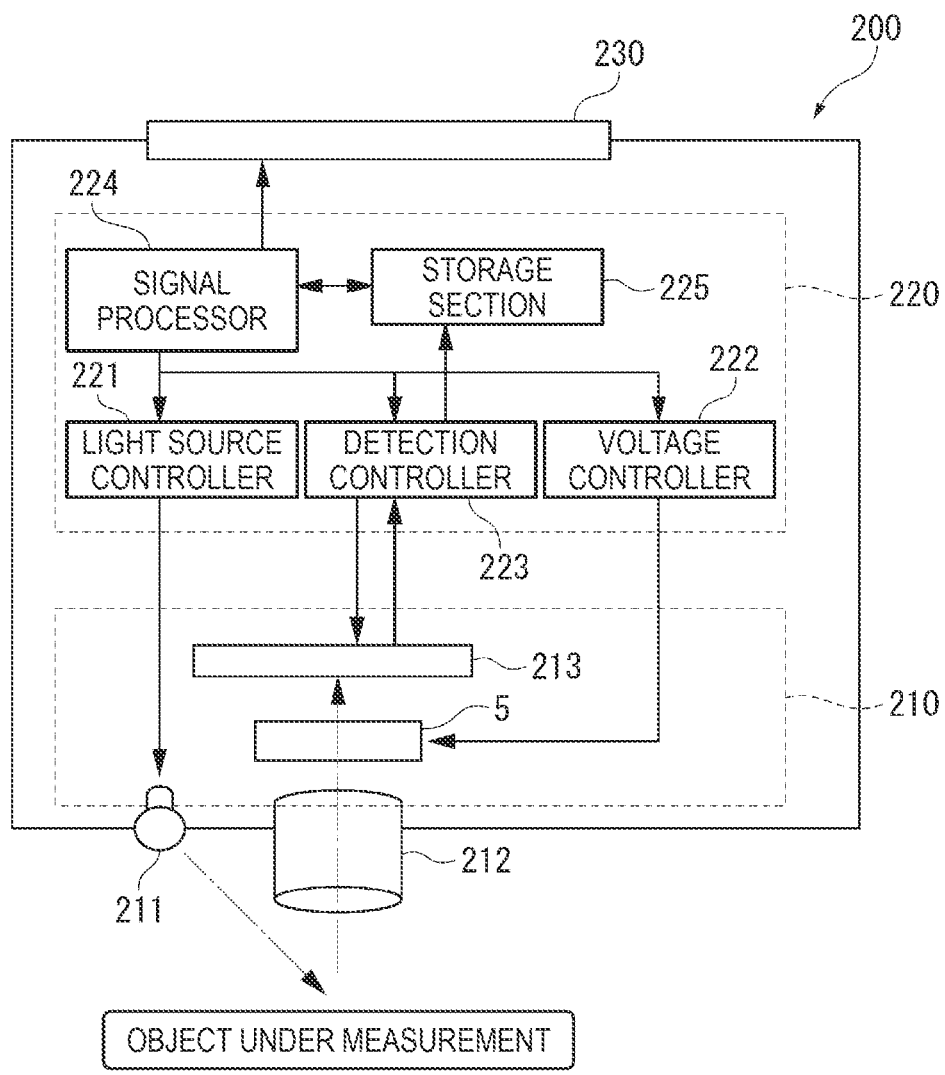
FIG. 12 shows a schematic configuration of a food analyzer (electronic apparatus) including the wavelength tunable interference filter of any of the embodiments according to the invention.

FIG. 12 shows a schematic configuration of a food analyzer that is an example of the electronic apparatus using the wavelength tunable interference filter 5.

A food analyzer 200 includes a detection unit 210 (optical module), a control unit 220, and a display unit 230, as shown in FIG. 12. The detection unit 210 includes a light source 211, which emits light, an imaging lens 212, through which light from an object under measurement is introduced, the wavelength tunable interference filter 5, which separates light from the light introduced through the imaging lens 212, and an imaging section 213 (detection section), which detects the separated light.

The control unit 220 includes a light source controller 221, which performs light-on/off control on the light source 211 and performs luminance control when the light source 211 is emitting light, a voltage controller 222, which controls the wavelength tunable interference filter 5, a detection controller 223, which controls the imaging section 213 to acquire a spectroscopic image captured with the imaging section 213, a signal processor 224 (processing controller), and a storage section 225.

In the food analyzer 200, when the system thereof is driven, the light source controller 221 controls the light source 211 to cause it to emit light toward an object under measurement. Light reflected off the object under measurement then passes through the imaging lens 212 and enters the wavelength tunable interference filter 5. The wavelength tunable interference filter 5 is driven under the control of the voltage controller 222 based on the drive method shown in the first embodiment described above. The wavelength tunable interference filter 5 can thus precisely extracts light of a target wavelength. The extracted light is then captured as an image with the imaging section 213 formed, for example, of a CCD camera. The captured image light is accumulated as a spectroscopic image in the storage section 225. The signal processor 224 controls the voltage controller 222 to change the value of the voltage applied to the wavelength tunable interference filter 5 to acquire spectroscopic images of a variety of wavelengths.

The signal processor 224 then computes data from the pixels of each of the images accumulated in the storage section 225 to determine a spectrum at each of the pixels. The storage section 225 further stores, for example, information on the composition of food corresponding to a spectrum, and the signal processor 224 analyzes data on the determined spectra based on the information on food stored in the storage section 225 to determine food components contained in the object under detection and the contents of the food components. Further, the calorie, the degree of freshness, and other factors of the food can be calculated based on the resultant food components and contents thereof. Moreover, the spectral distribution in each image can be analyzed, for example, to extract a portion of the food under inspection where freshness has lowered, and even foreign matter and other undesirable objects contained in the food can be detected.

The signal processor 224 then displays information on the thus obtained components, contents, calorie, freshness, and other factors of the food under inspection on the display unit 230.

In addition to the example of the food analyzer 200 shown FIG. 12, substantially the same configuration can be used as noninvasive measurement apparatus described above that measure other types of information. For example, a bioanalyzer that analyzes biological components, for example, measures and analyzes blood or other bodily fluid components, can be provided. A bioanalyzer of this type, for example, an apparatus that measures blood and other bodily fluid components, can be an apparatus that senses ethyl alcohol, which can be used as a drunk-driving prevention apparatus that detects the state of a drunk driver. Further, an electronic endoscope system including a bioanalyzer of this type can be provided.

Moreover, a mineral analyzer that analyzes mineral components can be provided.

Further, the optical module and the electronic apparatus according to the embodiments of the invention are applicable to the following apparatus.

For example, changing the intensity of light of a variety of wavelengths over time allows the light of a variety of wavelengths to transmit data. In this case, a wavelength tunable interference filter provided in an optical module separates light of a specific wavelength and a light receiver receives the light for extraction of the data transmitted by the light of the specific wavelength. An electronic apparatus including the data extraction optical module can process the data carried by the light of a variety of wavelengths for optical communication.

Further, a wavelength tunable interference filter may be used as a bandpass filter. For example, an optical laser apparatus in which a wavelength tunable interference filter receives light within a predetermined wavelength region emitted from a light emitting device, separates only narrowband light around a predetermined wavelength, and transmits the separated light can be provided.

Moreover, a wavelength tunable interference filter may be used as a biometrics authentication apparatus. For example, a wavelength tunable interference filter is also applicable to an authentication apparatus based on blood vessels, fingerprints, retina, iris, or any other body part by using near-infrared light or visible light.

Further, the optical module and the electronic apparatus can be used as a concentration detection apparatus. In this case, a wavelength tunable interference filter separates infrared energy (infrared light) radiated from an object, and the energy is analyzed for measurement of the concentration of a subject in a sample.

As described above, the optical module and the electronic apparatus according to the embodiments of the invention are applicable to any apparatus that separates predetermined light from incident light. Since a wavelength tunable interference filter can by itself separate light of a plurality of wavelengths from each other as described above, spectral measurement based on the plurality of wavelengths and detection of a plurality of components can be performed with precision. Each of the optical module and the electronic apparatus has a size further smaller than the size of an apparatus of related art that extracts light of a desired wavelength by using a plurality of devices and can, for example, be preferably used as a portable or on-vehicle optical device.

In addition, the specific structure according to any of the embodiments of the invention can be changed as appropriate in actual implementation of the invention to any other structure to the extent that the advantage of the invention is achieved.

The entire disclosure of Japanese Patent Application No. 2013-020168 filed Feb. 5, 2013 is expressly incorporated by reference herein.

What is claimed is:

1. An optical module comprising:
   a first reflection film that reflects part of incident light and transmits part thereof;
   a second reflection film that faces the first reflection film, reflects part of incident light, and transmits part thereof;
   a first driver provided in a region outside an optical interference area formed by the first reflection film and the second reflection film in a plan view, the first driver having a plurality of sub-drivers that are driven independently of each other via voltage application;
   a second driver that changes a dimension of a gap between the first reflection film and the second reflection film; and
   a voltage controller that applies first drive voltages to the sub-drivers and applies a second drive voltage to the second driver,
   wherein the voltage controller applies a first drive voltage set for each of the sub-drivers in accordance with parallelism between the first reflection film and the second reflection film at a time when the dimension of the gap is changed.

2. The optical module according to claim 1, further comprising:
   a gap detector that detects the dimension of the gap,
   wherein the voltage controller applies the first drive voltages to the first driver to change the dimension of the gap by a predetermined amount and then applies a feedback voltage according to a size of gap detected with the gap detector to the second driver.

3. The optical module according to claim 2,
   wherein the gap detector detects the dimension of the gap by detecting a capacitance between the first reflection film and the second reflection film.

4. The optical module according to claim 1,
   wherein the first driver has three or more sub-drivers, and the voltage controller applies the first drive voltage having either of two types of voltage waveforms to each of the sub-drivers.

5. The optical module according to claim 4, wherein one of the first drive voltages having two types of voltage waveforms has a reference voltage waveform.

6. The optical module according to claim 1, wherein the first driver has three or more sub-drivers, the voltage controller applies the first drive voltage having either of three types of voltage waveforms to each of the sub-drivers, and one of the first drive voltages having three types of voltage waveforms has a reference voltage waveform.

7. The optical module according to claim 1, wherein each of the first driver and the second driver is an electrostatic actuator.

8. The optical module according to claim 1, wherein the first driver controls parallelism between the first reflection film and the second reflection film, and the second driver changes the dimension of the gap.

9. The optical module according to claim 1, wherein the first driver is disposed in a region outside the second driver.

10. The optical module according to claim 1, wherein the plurality of sub-drivers of the first driver are disposed in an arcuate form along a circumference of an imaginary circle around a center of the first reflection film and a center of the second reflection film at equal angular intervals along the circumference of the imaginary circle in the plan view.

11. An electronic apparatus comprising:
an optical module; and
a control unit that controls the optical module,
the optical module including:
   a first reflection film that reflects part of incident light and transmits part thereof,
   a second reflection film that faces the first reflection film via a gap, reflects part of incident light, and transmits part thereof,
   a first driver provided in a region outside an optical interference area formed by the first reflection film and the second reflection film in a plan view, the first driver having a plurality of sub-drivers that can be driven independently of each other via voltage application,
   a second driver that changes a dimension of the gap between the first reflection film and the second reflection film, and
   a voltage controller that applies first drive voltages to the sub-drivers and applies a second drive voltage to the second driver,
wherein the voltage controller applies a first drive voltage set for each of the sub-drivers in accordance with parallelism between the first reflection film and the second reflection film at the time when the second driver changes dimension of the gap.

12. A spectroscopic camera comprising:
an optical module; and
a control unit that controls the optical module,
the optical module including:
   a first reflection film that reflects part of incident light and transmits part thereof,
   a second reflection film that faces the first reflection film via a gap, reflects part of incident light, and transmits part thereof,
   a first driver provided in a region outside an optical interference area formed by the first reflection film and the second reflection film in a plan view, the first driver having a plurality of sub-drivers that can be driven independently of each other via voltage application,
   a second driver that changes a dimension of the gap between the first reflection film and the second reflection film,
   a voltage controller that applies first drive voltages to the sub-drivers and applies a second drive voltage to the second driver, and
   an imaging section that receives light of a wavelength selected based on interference of light that enters the gap between the first reflection film and the second reflection film to capture a spectroscopic image,
wherein the voltage controller applies a first drive voltage set for each of the sub-drivers in accordance with parallelism between the first reflection film and the second reflection film at the time when the second driver changes dimension of the gap.

\* \* \* \* \*